(12) United States Patent
Park et al.

(10) Patent No.: US 12,474,742 B2
(45) Date of Patent: Nov. 18, 2025

(54) ELECTRONIC DEVICE COMPRISING FLEXIBLE WINDOW

(71) Applicant: SAMSUNG ELECTRONICS CO., LTD., Suwon-si (KR)

(72) Inventors: Byounggyu Park, Suwon-si (KR); Taejeong Kim, Suwon-si (KR); Youngmin Moon, Suwon-si (KR); Jaehyun Bae, Suwon-si (KR); Kyunghwan Song, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 18/240,184

(22) Filed: Aug. 30, 2023

(65) Prior Publication Data

US 2024/0069602 A1 Feb. 29, 2024

Related U.S. Application Data

(63) Continuation of application No. PCT/KR2023/012685, filed on Aug. 25, 2023.

(30) Foreign Application Priority Data

Aug. 30, 2022 (KR) .................. 10-2022-0109461
Oct. 6, 2022 (KR) .................. 10-2022-0128015

(51) Int. Cl.
*B32B 7/02* (2019.01)
*G06F 1/16* (2006.01)
*H04M 1/02* (2006.01)

(52) U.S. Cl.
CPC .......... *G06F 1/1656* (2013.01); *G06F 1/1616* (2013.01); *G06F 1/1652* (2013.01); *H04M 1/0216* (2013.01); *H04M 1/0268* (2013.01)

(58) Field of Classification Search
CPC .... G06F 1/1616; G06F 1/1652; G06F 1/1656; H04M 1/0214; H04M 1/0216; H04M 1/0268
See application file for complete search history.

(56) References Cited

U.S. PATENT DOCUMENTS

2014/0192534 A1  7/2014  Cho
2016/0282661 A1  9/2016  Nam
(Continued)

FOREIGN PATENT DOCUMENTS

CN          113472924 A   10/2021
KR    10-2014-0090498 A    7/2014
(Continued)

OTHER PUBLICATIONS

International Search Report and Written Opinion (PCT/ISA/210 and PCT/ISA/237) dated Nov. 29, 2023, issued by International Searching Authority for International Application No. PCT/KR2023/012685.

*Primary Examiner* — Lawrence D Ferguson
(74) *Attorney, Agent, or Firm* — Sughrue Mion, PLLC

(57) ABSTRACT

An electronic device includes a flexible display panel connected to a first housing and a second housing; and a flexible window that is coupled to one surface of the flexible display panel. The flexible window includes a deformation area that is deformable together with the flexible display panel around at least one folding axis. The flexible window includes a glass layer. A first polymer layer is disposed between the glass layer and the flexible display panel. An adhesive layer is laminated on the second surface of the glass layer. The adhesive layer includes at least one uneven structure formed on one surface that faces an opposite direction to the second surface of the glass layer and is at least partially overlapped with the at least one first curved-surface portion or the at (Continued)

least one second curved-surface portion. A second polymer layer is laminated on the adhesive layer.

20 Claims, 9 Drawing Sheets

(56) References Cited

U.S. PATENT DOCUMENTS

| | | |
|---|---|---|
| 2017/0020014 A1 | 1/2017 | Lee et al. |
| 2017/0062742 A1 | 3/2017 | Kim |
| 2020/0212340 A1 | 7/2020 | Ai et al. |
| 2020/0292731 A1 | 9/2020 | Park et al. |
| 2021/0135146 A1 | 5/2021 | Kim et al. |
| 2023/0266799 A1 | 8/2023 | Kim et al. |

FOREIGN PATENT DOCUMENTS

| | | |
|---|---|---|
| KR | 10-2017-0008371 A | 1/2017 |
| KR | 10-2017-0026908 A | 3/2017 |
| KR | 10-2019-0052954 A | 5/2019 |
| KR | 10-2068685 B1 | 1/2020 |
| KR | 10-2020-0073596 A | 6/2020 |
| KR | 10-2020-0079977 A | 7/2020 |
| KR | 10-2021-0054650 A | 5/2021 |
| KR | 10-2021-0056103 A | 5/2021 |
| KR | 10-2021-0077511 A | 6/2021 |
| KR | 10-2022-0065575 A | 5/2022 |
| KR | 10-2022-0112104 A | 8/2022 |

ELECTRONIC DEVICE COMPRISING FLEXIBLE WINDOW

CROSS-REFERENCE TO RELATED APPLICATIONS

This application is a bypass continuation application of International Application No. PCT/KR2023/012685, filed on Aug. 25, 2023, which is based on and claims the benefit of a Korean Patent Application No. 10-2022-0109461, filed on Aug. 30, 2022, in the Korean Intellectual Property Office, and to a Korean Patent Application No. 10-2022-0128015, filed on Oct. 6, 2022, in the Korean Intellectual Property Office, the disclosures of each of which are incorporated by reference herein in their entireties.

BACKGROUND

1. Field

The disclosure relates to a display including a flexible window, and an electronic device including the same.

2. Description of Related Art

In line with increasing demands for mobile communication and high degrees of integration of electronic devices, various technologies have been developed to improve the portability of electronic devices such as mobile communication terminals, and to improve user convenience in connection with the use of multimedia functions, and the like. For example, flexible displays, foldable displays, and/or rollable displays have become commercially available, and the portability of electronic devices and the convenience thereof are expected to be further improved. A flexible display may include a flexible window (cover window) laminated on one surface of a display panel (for example, a light-emitting layer, an electrode layer, and/or an encapsulation layer). The flexible window may protect the display panel from external physical/chemical impacts while performing a function of displaying images or videos by transmitting light or screens output by the display panel. For example, the display and the flexible window may have an adhesive member therebetween and may thus be attached to each other. The flexible window may be implemented as a flexible window that can be folded or rolled together with the flexible display.

The above-described information may be provided as a background art for the purpose of helping understanding of the disclosure. No claim or determination is raised regarding whether any of the above description is applicable as a prior art in connection with the disclosure.

SUMMARY

According to an aspect of the disclosure, an electronic device includes a first housing; a second housing rotatably connected to the first housing; a flexible display panel connected to the first housing and the second housing; and a flexible window that is coupled to one surface of the flexible display panel, the flexible window including a deformation area that is deformable together with the flexible display panel around at least one folding axis, based on a rotation of the second housing, wherein the flexible window includes: a glass layer including: at least one first curved-surface portion formed on a first surface of the glass layer, the first surface facing the one surface of the flexible display panel and disposed within the deformation area, and at least one second curved-surface portion formed on a second surface of the glass layer, the second surface facing an opposite direction to the first surface and at least partially overlapped with the at least one first curved-surface portion; a first polymer layer disposed between the glass layer and the flexible display panel; an adhesive layer that is laminated on the second surface of the glass layer, the adhesive layer including at least one uneven structure formed on one surface that faces an opposite direction to the second surface of the glass layer, and is at least partially overlapped with the at least one first curved-surface portion or the at least one second curved-surface portion; and a second polymer layer laminated on the adhesive layer.

At least two of the at least one first curved-surface portion, the at least one second curved-surface portion, or the at least one uneven structure may be aligned with reference to an axis.

A width of the at least one first curved-surface portion may be greater than a width of the at least one second curved-surface portion.

A width of the at least one first curved-surface portion may be greater than a width of the at least one uneven structure.

The glass layer may include a material having a refractive index higher than that of at least one of the first polymer layer, the second polymer layer or the adhesive layer.

At least one of the at least one first curved-surface portion or the at least one second curved-surface portion may have a concave shape.

At least one of the first polymer layer or the adhesive layer may include at least one uneven structure having a convex shape engaged with the concave shape of the at least one first curved-surface portion or the at least one second curved-surface portion.

Each of the at least one first curved-surface portion and the at least one second curved-surface portion may have a concave shape, and a height of the at least one uneven structure may be higher than a height of the concave shape of the at least one first curved-surface portion and the at least one second curved-surface portion.

The at least one uneven structure may have a convex shape, and the adhesive layer may include a material having a refractive index lower than the glass layer.

A height of the concave shape may be smaller than a height of the convex shape of the at least one uneven structure.

The at least one uneven structure may have a convex shape, and the second polymer layer may include a structure having a concave shape engaged with the at least one uneven structure.

At least one of the first polymer layer, the second polymer layer, or the adhesive layer may include an at least partially transparent area.

The glass layer may be flexible glass having a thin film shape.

The electronic device may further include a coating layer laminated on the second polymer layer.

The flexible display panel may be configured to be foldable along the at least one folding axis so that the coating layer is disposed inside the electronic device.

According to an aspect of the disclosure, an electronic device includes: a first housing; a second housing rotatably connected to the first housing; a flexible display panel connected to the first housing and the second housing; and a flexible window that is coupled to one surface of the flexible display panel, the flexible window including a deformation area that is deformable together with the flexible display panel around at least one folding axis based on a rotation of the second housing, wherein the flexible window includes: a glass layer including: at least one first curved-surface portion formed on a first surface of the glass layer, the first surface facing the one surface of the flexible display panel and disposed within the deformation area, and at least one second curved-surface portion formed on a second surface of the glass layer, the second surface facing an opposite direction to the first surface and at least partially overlapped with the at least one first curved-surface portion; a first polymer layer laminated on the one surface of the flexible display panel; an adhesive layer which is disposed between the first polymer layer and the first surface of the glass layer, the adhesive layer including at least one uneven structure formed on one surface that faces the first polymer layer and is at least partially overlapped with the at least one first curved-surface portion or the at least one second curved-surface portion; and a second polymer layer laminated on the second surface of the glass layer.

At least two of the at least one first curved-surface portion, the at least one second curved-surface portion, or the at least one uneven structure may be aligned with reference to an axis.

A width of the at least one first curved-surface portion may be greater than a width of the at least one second curved-surface portion and a width of the at least one uneven structure.

Each of the at least one first curved-surface portion and the at least one second curved-surface portion may have a concave shape, and the at least one uneven structure may have a convex shape and a height of the convex shape may be greater than a height of the concave shape.

The electronic device may include a coating layer laminated on the second polymer layer, wherein the flexible display panel may be configured to be foldable along the at least one folding axis so that the coating layer is exposed to the outside of the electronic device.

According to an aspect of the disclosure, an electronic device includes: a flexible display panel connected to a first housing and a second housing; and a flexible window that is deformable together with the flexible display panel around at least one folding axis, wherein the flexible window includes: a glass layer including: at least one first curved-surface portion formed on a first surface of the glass layer, and at least one second curved-surface portion formed on a second surface of the glass layer, the second surface facing an opposite direction to the first surface and at least partially overlapped with the at least one first curved-surface portion; and an adhesive layer that is laminated on the second surface of the glass layer, the adhesive layer including at least one uneven structure formed on one surface that faces an opposite direction to the second surface of the glass layer, and is at least partially overlapped with the at least one first curved-surface portion or the at least one second curved-surface portion.

At least two of the at least one first curved-surface portion, the at least one second curved-surface portion, or the at least one uneven structure may be aligned with reference to an axis.

A width of the at least one first curved-surface portion may be greater than a width of the at least one second curved-surface portion.

The width of the at least one first curved-surface portion may be greater than a width of the at least one uneven structure.

The glass layer may include a material having a refractive index higher than that of the adhesive layer.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
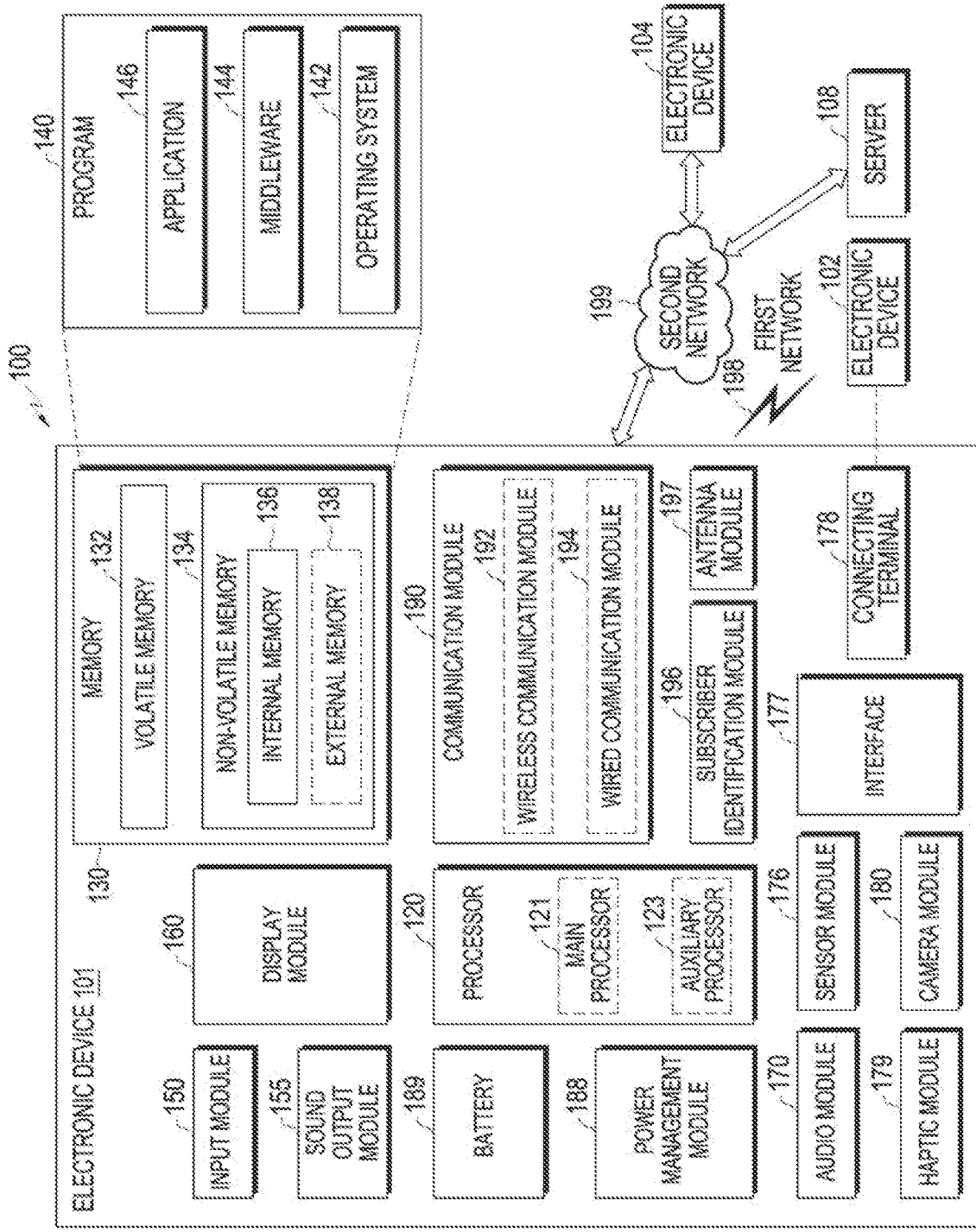
FIG. 1 is a block diagram of an electronic device in a network environment, according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following detailed descriptions, a longitudinal direction, a width direction, and/or a thickness direction of an electronic device may be mentioned, the longitudinal direction may be defined as the "Y-axis direction", the width direction may be defined as the "X-axis direction", and/or the thickness direction may be defined as the "Z-axis direction". In an embodiment, in connection with the direction in which an element is directed, in addition to an orthogonal coordinate system illustrated in the drawings, "negative/positive (−/+)" may be mentioned together therewith. For example, the front surface of an electronic device or a housing may be defined as a "surface oriented in the +Z-direction", and the rear surface thereof may be defined as a "surface oriented in the −Z-direction". In an embodiment, the side surface of an electronic device or a housing may include an area oriented in the +X-direction, an area oriented in the +Y-direction, an area oriented in the −X-direction, and/or an area oriented in the −Y-direction. In another embodiment, the "X-axis direction" may be a meaning including both the "−X-direction" and the "+X-direction". The foregoing is based on the orthogonal coordinate system illustrated in the drawings for the sake of brevity of descriptions, and it should be noted that the directions or descriptions of elements do not limit the one or more embodiments disclosed in the disclosure. For example, the aforementioned direction of the front surface or the rear surface may change according to an unfolded state or a folded state of an electronic device, and the aforementioned directions may be differently interpreted according to a gripping habit of a user.

Figure 2:
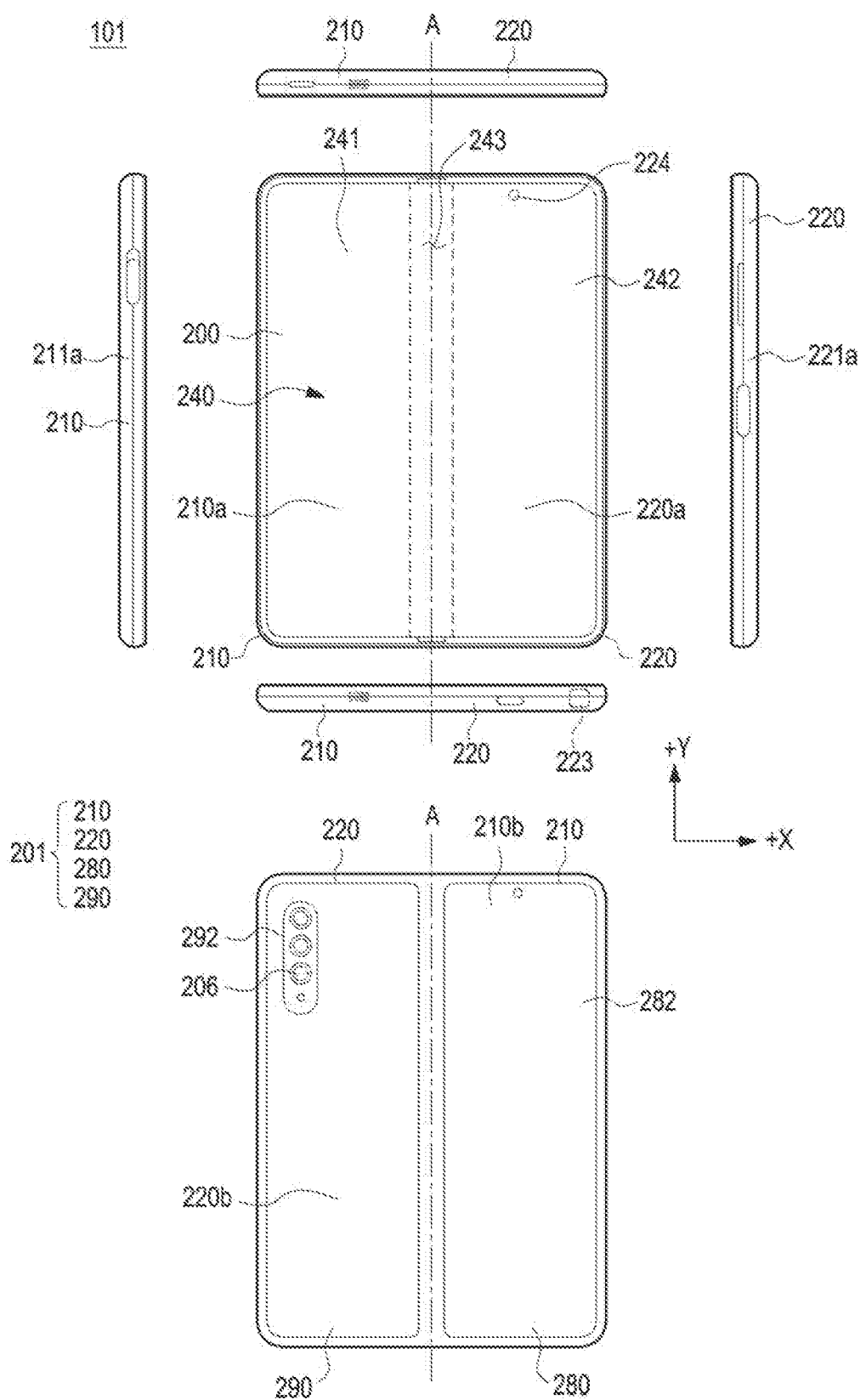
FIG. 2 is a view showing an unfolded state of an electronic device, according to an embodiment.
Figure 3:
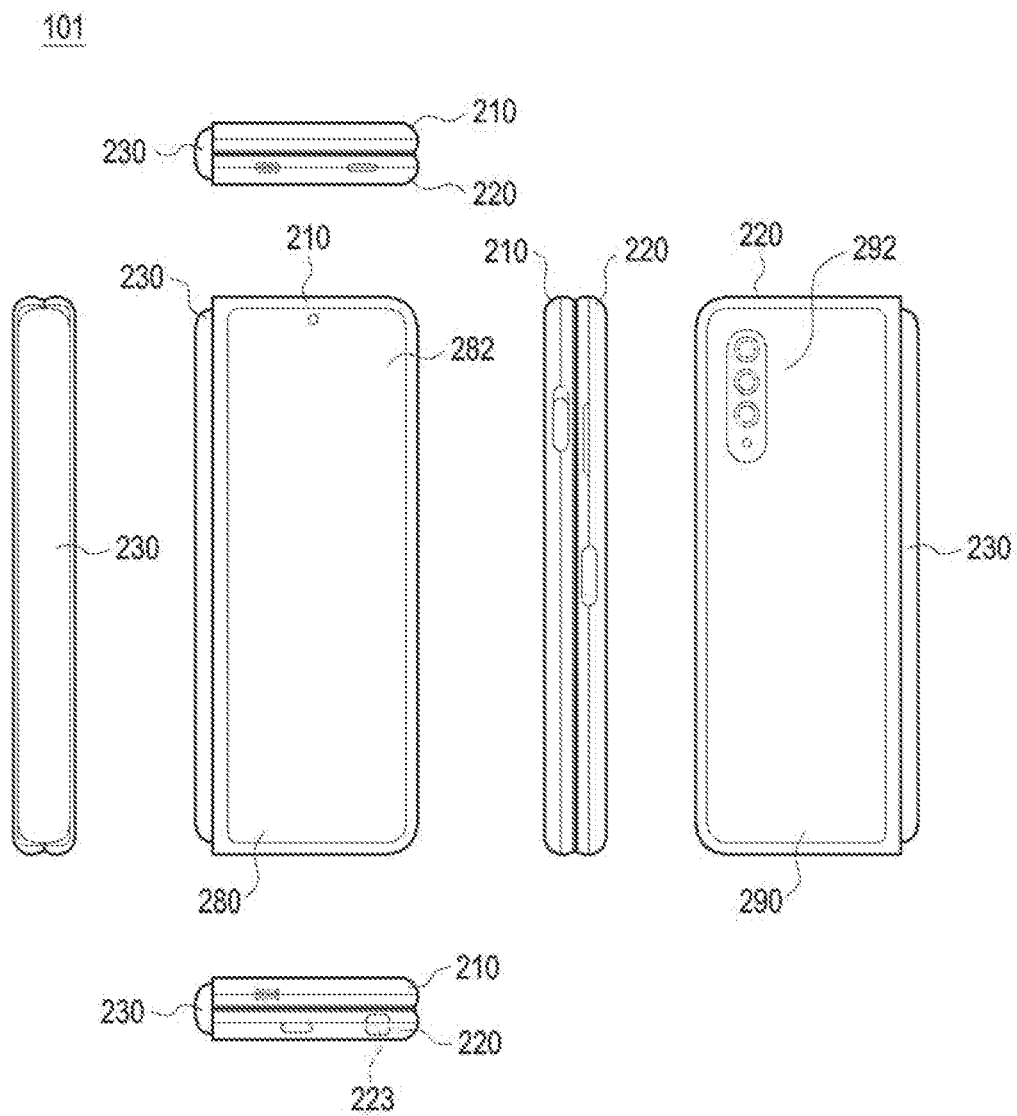
FIG. 3 is a view showing a folded state of an electronic device, according to an embodiment.

FIG. 2 is a view showing an unfolded state of an electronic device according to an embodiment. FIG. 3 is a view showing a folded state of an electronic device according to an embodiment. The configurations of an electronic device 101 in FIG. 2 and FIG. 3 may be entirely or partially the same as the configurations of an electronic device 101 in FIG. 1.

FIG. 2 is a view showing an unfolded state of an electronic device according to an embodiment. FIG. 3 is a view showing a folded state of an electronic device according to an embodiment.

Referring to FIG. 2 and FIG. 3, in an embodiment, an electronic device 101 may include a housing 201, a hinge cover 230 for covering a foldable portion of the housing 201, and a flexible or foldable display 240 (hereinafter, abbreviated as a "display" 240) disposed in a space formed by the housing 201. According to an embodiment, the surface, on which the display 240 is disposed, may be defined as a front surface (e.g., the first front surface 210a and the second front surface 220a) of the electronic device 101. In addition, the surface opposite to the front surface may be defined as a rear surface (e.g., the first rear surface 210b and the second rear surface 220b) of the electronic device 101. In addition, the surfaces surrounding the space between the front surface and the rear surface may be defined as side surfaces (e.g., the first side surface 211a and the second side surface 221a) of the electronic device 101.

Figure 4:
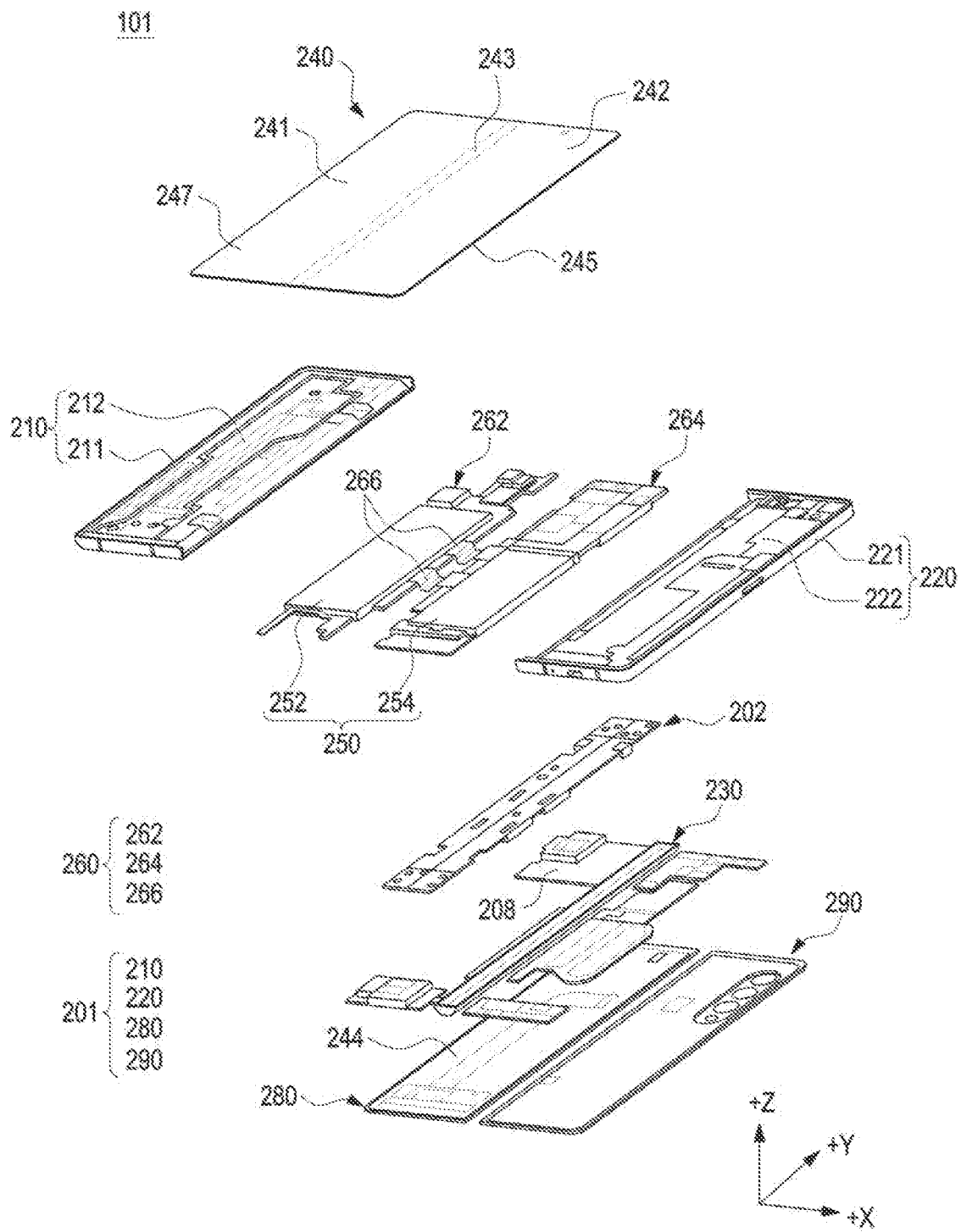
FIG. 4 is an exploded perspective view of an electronic device, according to an embodiment.

According to an embodiment, the housing 201 may include a first housing 210, a second housing 220 rotatably coupled to the first housing 210, a first rear cover 280, a second rear cover 290, and a hinge module (e.g., the hinge module 202 in FIG. 4). The hinge module 202 may provide at least one folding axis A functioning as a rotation center of the first housing 210 and/or the second housing 220. The housing 201 of the electronic device 101 may not be limited to the shape and the combination illustrated in FIG. 3 and FIG. 4, and may be implemented in other shapes or by a combination and/or coupling of components. For example, in an embodiment, the first housing 210 and the first rear cover 280 may be integrally formed, and the second housing 220 and the second rear cover 290 may be integrally formed.

According to an embodiment, the first housing 210 may include a first front surface 210a connected to a hinge module (e.g., the hinge module 202 in FIG. 4) and oriented in a first direction, and a first rear surface 210b oriented in a second direction opposite to the first direction. The second housing 220 may include a second front surface 220a connected to the hinge module 202 and oriented in a third direction, and a second rear surface 220b oriented in a fourth direction opposite to the third direction, and may rotate relative to the first housing 210 around the hinge module 202. Accordingly, the electronic device 101 may change to a folded state or an unfolded state. The electronic device 101 may be configured such that the first front surface 210a faces the second front surface 220a in a folded state, and the third direction is substantially parallel to the first direction in an unfolded state. Hereinafter, unless otherwise stated, the directions of the electronic device 101 will be described based on an unfolded state.

According to an embodiment, the first housing 210 and the second housing 220 may be arranged at both sides around the folding axis A, and may have a substantially symmetrical shape with reference to the folding axis A. As described below, the angle formed by the first housing 210 and the second housing 220 and the distance between the first housing and the second housing may be changed according to whether the electronic device 101 is in an unfolded state, a folded state, or an intermediate state. According to an embodiment, differently from the first housing 210, the second housing 220 may additionally include a sensor area 224 in which various sensors are arranged. However, the second housing and the first housing 210 may have a symmetrical shape in other areas than the sensor area. According to an embodiment, the folding axis A may have multiple (e.g., two) folding axes parallel to each other. In an embodiment, the folding axis A may be provided along the longitudinal direction (the Y-axis direction) of the electronic device 101, but the direction of the folding axis A is not limited thereto. For example, according to an external design thereof or a usage habit of a user, it may be understood that the electronic device 101 includes the folding axis A extending along the width direction (e.g., the X-axis direction) thereof.

According to an embodiment, the electronic device 101 may include a structure into which a digital pen can be inserted. For example, a hole 223, into which a digital pen can be inserted, may be formed through the side surface of the first housing 210 or the side surface of the second housing 220 of the electronic device 101.

According to an embodiment, at least a part of the first housing 210 and the second housing 220 may be formed of a metal material or a non-metal material having rigidity of a degree selected in order to support the display 240. At least a portion thereof, which is formed of a metal material, may provide a ground plane of the electronic device 101, and may be electrically connected to a ground conductor provided on a printed circuit board (e.g., the substrate part 260 in FIG. 4).

According to an embodiment, the sensor area 224 may be formed to be adjacent to a corner of the second housing 220 and have a predetermined area. However, the arrangement, shape, and size of the sensor area 224 are not be limited to the illustrated example. For example, in an embodiment, the sensor area 224 may be provided in other corners of the second housing 220 or an area between the top corner and the bottom corner thereof, or the first housing 210. According to an embodiment, components embedded in the electronic device 101 and configured to perform various functions may be visually exposed on the front surface of the electronic device 101, through the sensor area 224 or through one or more openings provided in the sensor area 224. In an embodiment, the components may include various types of sensors. For an example, the sensors may include at least one of a front camera, a receiver, or a proximity sensor.

According to an embodiment, the first rear cover 280 may be disposed at one side of the folding axis A on the rear surface of the electronic device 101, and for example, may have a substantially rectangular periphery, and the periphery may be surrounded by the first housing 210. Similarly thereto, the second rear cover 290 may be disposed at the other side of the folding axis A on the rear surface of the electronic device 101, and the periphery thereof may be surrounded by the second housing 220.

According to an embodiment, the first rear cover 280 and the second rear cover 290 may have a substantially symmetrical shape with reference to the folding axis A. However, the first rear cover 280 and the second rear cover 290 may not necessarily have a mutually symmetrical shape, and in an embodiment, the electronic device 101 may include the first rear cover 280 and the second rear cover 290 having various shapes.

According to an embodiment, the first rear cover 280, the second rear cover 290, the first housing 210, and the second housing 220 may form a space in which various components (e.g., a printed circuit board or a battery) of the electronic device 101 can be arranged. According to an embodiment, one or more components may be arranged or may be visually exposed on the rear surface of the electronic device 101. For example, at least a part of a sub-display (e.g., the sub-display 244 in FIG. 4) may be visually exposed through a first rear area 282 of the first rear cover 280. In an embodiment, one or more components or sensors may be visually exposed through a second rear area 292 of the second rear cover 290. In an embodiment, the sensors may include a proximity sensor and/or a camera module 206 (e.g., a rear camera).

According to an embodiment, a front camera visually exposed on the front surface of the electronic device 101 through one or more openings provided in the sensor area 224, or the camera module 206 visually exposed through the second rear area 292 of the second rear cover 290 may include one or multiple lenses, an image sensor, and/or an image signal processor. In an embodiment, two or more lenses (an infrared camera, a wide-angle lens, and a telephoto lens) and image sensors may be arranged on one surface of the electronic device 101.

Referring to FIG. 3, the hinge cover 230 may be disposed between the first housing 210 and the second housing 220, and may be configured to cover an internal component (e.g., the hinge module 202 in FIG. 4). According to an embodiment, the hinge cover 230 may be covered by a part of the first housing 210 and the second housing 220 or may be exposed to the outside, according to a state (e.g., an unfolded state (flat state) or a folded state) of the electronic device 101. For example, in an unfolded state, the hinge cover 230 may be substantially covered by the first housing 210 and the second housing 220, and in a folded state, most of the outer side surface of the hinge cover 230 may be exposed to the outside.

According to an embodiment, as illustrated in FIG. 2, if the electronic device 101 is in an unfolded state, the hinge cover 230 may be covered by the first housing 210 and the second housing 220 and thus may not be exposed. As another example, as illustrated in FIG. 3, if the electronic device 101 is in a folded state (e.g., a fully folded state), the hinge cover 230 may be exposed to the outside, between the first housing 210 and the second housing 220. As another example, if the first housing 210 and the second housing 220 are in an intermediate state which is folded with a certain angle, the hinge cover 230 may be partially exposed to the outside, between the first housing 210 and the second housing 220. However, in this case, the exposed area may be smaller than that of the fully folded state. In an embodiment, the hinge cover 230 may include a curved surface.

According to an embodiment, the display 240 may be disposed in a space formed by the housing 201. For example, the display 240 may be seated in a recess formed by the housing 201 and may constitute most of the front surface of the electronic device 101. Accordingly, the front surface of the electronic device 101 may include the display 240, and a partial area of the first housing 210 and a partial area of the second housing 220, the partial areas being adjacent to the display 240. In addition, the rear surface of the electronic device 101 may include the first rear cover 280, a partial area of the first housing 210, which is adjacent to the first rear cover 280, a second rear cover 290, and a partial area of the second housing 220, which are adjacent to the second rear cover 290.

According to an embodiment, the display 240 may mean a display of which at least a partial area may be deformed into a flat surface or a curved surface. According to an embodiment, the display 240 may include a folding area 243, a first display area 241 disposed at one side (e.g., at the left side or in the −X-direction of the folding area 243 illustrated in FIG. 2) with reference to the folding area 243, and a second display area 242 disposed at the other side (e.g., at the right side or in the +X-direction of the folding area 243 illustrated in FIG. 2).

However, the division of the area of the display 240 according to an embodiment may be exemplary, and the area of the display 240 may be divided into multiple (e.g., two or more) areas according to a structure or a function thereof. For example, according to an embodiment illustrated in FIG. 2, the area of the display 240 may be divided by a folding area 243 extending along an axis (e.g., the axis Y) or a folding axis (the axis A). In an embodiment, the area of the display 240 may be divided with reference to another folding area (e.g., a folding area parallel to the axis X) or another folding axis (e.g., a folding axis parallel to the axis X). According to an embodiment, the display 240 may be coupled to or disposed adjacent to a touch detection circuit, a pressure sensor capable of measuring the intensity (e.g., pressure) of touch, and/or a digitizer configured to detect a magnetic field type stylus pen.

According to an embodiment, the first display area 241 and the second display area 242 may have an overall symmetrical shape around the folding area 243. However, according to an embodiment, differently from the first display area 241, the second display area 242 may include a notch which is cut according to the presence of the sensor area 224, but in an area other than the area in which the notch is formed, may have a symmetrical shape with the first display area 241. In other words, the first display area 241 and the second display area 242 may include portions having a shape symmetric to each other and portions having shapes asymmetric to each other.

Hereinafter, operations of the first housing 210 and the second housing 220 and each area of the display 240 according to a state (e.g., an unfolded state (a flat state) and a folded state) of the electronic device 101 will be described.

According to an embodiment, if the electronic device 101 is in an unfolded state (a flat state) (e.g., FIG. 2), the first housing 210 and the second housing 220 may substantially form an angle of about 180 degrees, and thus the first display area 241 and the second display area 242 may be arranged to be oriented substantially in the same direction. For example, in an unfolded state, the surface of the first display area 241 and the surface of the second display area 242 may substantially form about 180 degrees to each other, and may be oriented in the same direction (e.g., the front direction of the electronic device). The folding area 243 may form substantially the same flat surface with the first display area 241 and the second display area 242.

According to an embodiment, if the electronic device 101 is in a folded state (e.g., FIG. 3), the first housing 210 and the second housing 220 may be arranged to face each other. The surface of the first display area 241 and the surface of the second display area 242 of the display 240 may form a narrow angle (e.g., an angle between 0 degrees and 10 degrees), and thus may substantially face each other. At least a part of the folding area 243 may be formed as a curved surface having a predetermined curvature.

According to an embodiment, if the electronic device 101 is in an intermediate state, the first housing 210 and the second housing 220 may be arranged at a certain angle to each other. The surface of the first display area 241 and the surface of the second display area 242 of the display 240 may form an angle larger than that of a folded state and smaller than that of an unfolded state. At least a part of the folding area 243 may be formed as a curved surface having a predetermined curvature, and at this time, the curvature may be smaller than that of a folded state.

FIG. 4 is an exploded perspective view of an electronic device according to an embodiment.

Referring to FIG. 4, the electronic device 101 may include a housing 201, the display 240, the hinge module 202, a battery 250, and a substrate part 260. The housing 201 may include a housing 210, a second housing 220, a first rear cover 280, and a second rear cover 290.

According to an embodiment, the housing 201 may include the first housing 210, the second housing 220, the hinge cover 230, the first rear cover 280, and the second rear cover 290. The configurations of the first housing 210, the second housing 220, the hinge cover 230, the first rear cover 280, and the second rear cover 290 in FIG. 4 may be entirely or partially the same as the configurations of the first housing 210, the second housing 220, the hinge cover 230, the first rear cover 280, and the second rear cover 290 in FIG. 2 and FIG. 3. In an embodiment, the hinge module 202 for providing the folding axis A may be disposed inside the housing 201 so as to rotatably connect the first housing 210 and the second housing 220 to each other.

According to an embodiment, the first housing 210 and the second housing 220 may be assembled to be coupled to each other at both sides of the hinge module 202. According to an embodiment, the first housing 210 may include a first support area 212 (e.g., a first support plate or a first support member) capable of supporting components (e.g., the first circuit board 262 and/or the first battery 252) of the electronic device 101, and a first side wall 211 surrounding at least a part of the first support area 212. The first side wall 211 may include a first side surface (e.g., the first side surface 211*a* in FIG. 2) of the electronic device 101. According to an embodiment, the second housing 220 may include a second support area 222 (e.g., a second support plate or a second support member) capable of supporting components (e.g., the second circuit board 264 and/or the second battery 254) of the electronic device 101, and a second side wall 221 surrounding at least a part of the second support area 222. The second side wall 221 may include a second side surface (e.g., the second side surface 221*a* in FIG. 2) of the electronic device 101.

According to an embodiment, the display 240 may include a first display area 241, a second display area 242, a folding area 243, and a sub-display 244. The configurations of the first display area 241, the second display area 242, and the folding area 243 in FIG. 4 may be entirely or partially the same as the configurations of the first display area 241, the second display area 242, and the folding area 243 in FIG. 2 and/or FIG. 3. In an embodiment, the display 240 may include a display panel 245 and a flexible window 247 (e.g., a flexible glass), and the display panel 245 may be disposed inside the flexible window 247 and thus be protected from an external environment. The display panel 245 and/or the flexible window 247 may be at least partially deformed between a flat-surface shape and a curved-surface shape according to the relative movement or rotation between the first housing 210 and the second housing 220.

According to an embodiment, the sub-display 244 may display a screen in a direction different from that of the display areas 241 and 242. For example, the sub-display 244 may output a screen in the direction opposite to the first display area 241. According to an embodiment, the sub-display 244 may be disposed on the first rear cover 280.

According to an embodiment, the battery 250 may include a first battery 252 disposed in the first housing 210 and a second battery 254 disposed in the second housing 220. According to an embodiment, the first battery 252 may be disposed on the first circuit board 262, and the second battery 254 may be disposed on the second circuit board 264.

According to an embodiment, the substrate part 260 may include a first circuit board 262 disposed in the first housing 210, and a second circuit board 264 disposed in the second housing 220. According to an embodiment, the substrate part 260 may include at least one flexible printed circuit board 266 for electrically connecting the first circuit board 262 and the second circuit board 264. According to an embodiment, at least a part of the flexible printed circuit board 266 may be disposed to cross the hinge module 202. According to an embodiment, the first circuit board 262 and the second circuit board 264 may be arranged inside a space formed by the first housing 210, the second housing 220, the first rear cover 280, and the second rear cover 290. Components for implementing various functions of the electronic device 101 may be arranged on the first circuit board 262 and the second circuit board 264.

According to an embodiment, the electronic device 101 may include a speaker module 208. According to an embodiment, the speaker module 208 may convert an electrical signal into sound. According to an embodiment, the speaker module 208 may be disposed inside a space formed by the first housing 210, the second housing 220, the first rear cover 280, and the second rear cover 290.

In the above description, although an embodiment having a configuration, in which the first housing 210 and the second housing 220 are rotatably connected or coupled by a hinge module (or referred to as a "hinge structure"), is exemplified, it should be noted that the embodiment does not limit the electronic device according to an embodiment. For example, the electronic device according to an embodiment may include three or more housings, and "one pair of housings" of the embodiment described above may mean "two housings, which are rotatably coupled to each other, among three or more housings".

Although the electronic device 101 illustrated in FIG. 2 to FIG. 4 has the outer appearance of a foldable electronic device, embodiments of the disclosure are not limited thereto. For example, the illustrated electronic device may have a bar type electronic device, a plate type electronic device, or a rollable electronic device. A "rollable electronic device" may mean an electronic device in which a display (e.g., the display 240 in FIG. 4) may be bent and deformed so that at least portion thereof is rolled or wound, or is accommodated inside a housing (e.g., the housing 201 in FIG. 2). According to needs of a user, a rollable electronic device may have a display which is unfoldable or has a larger area exposed to the outside, so as to expand and use a screen display area.

In the detailed description below, multiple grooves or a direction in which multiple grooves are extended, and/or multiple grooves or a direction in which multiple grooves are arranged, will be described with reference to an orthogonal coordinate system in FIG. 4. The extension direction or the arrangement direction may be referred to as a "first direction" or a "second direction" which is different from the "first direction" or the "second direction" indicating the direction in which the front surface and the rear surface of the housing in FIG. 2 or FIG. 3 are arranged. The "first direction" or the "second direction" referred to as the extension direction or the arrangement direction may be distinguished from the "first direction" or the "second direction" in the descriptions referring to FIG. 2 and FIG. 3, by adding a reference number of the orthogonal coordinate system thereto.

Figure 5:
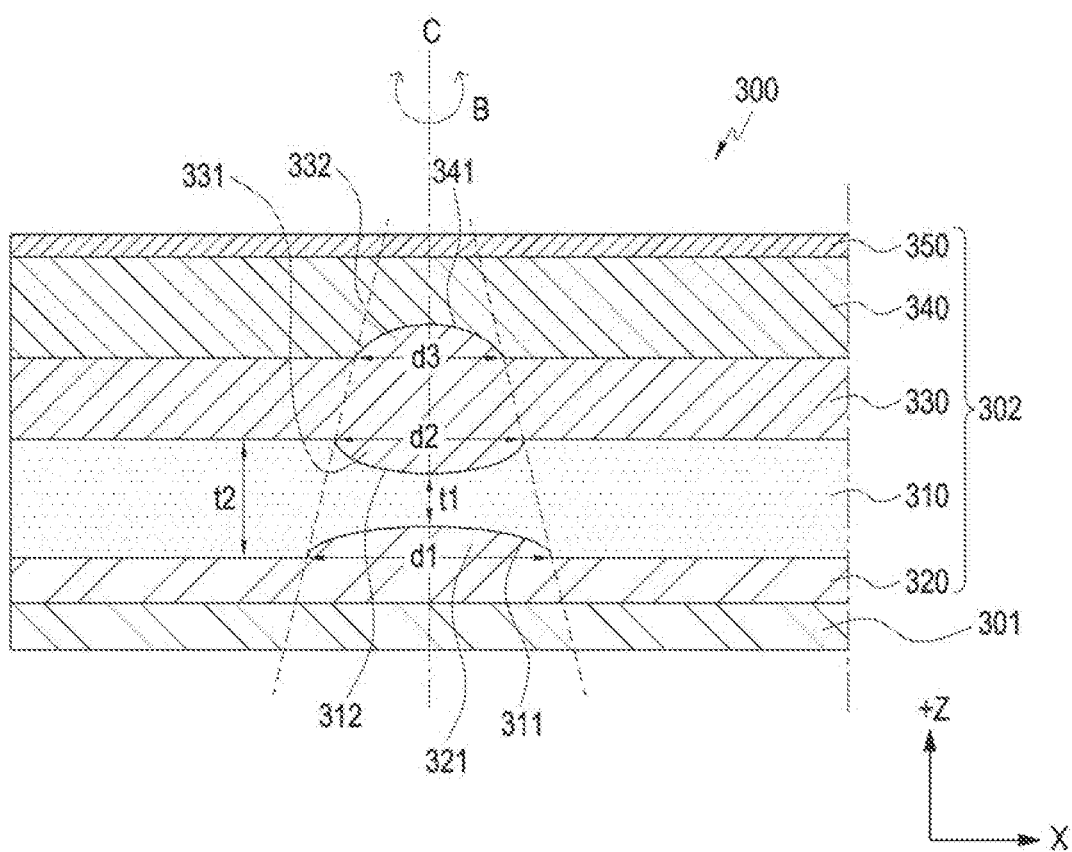
FIG. 5 is a cross-sectional view of a display of an electronic device in an unfolded state, according to an embodiment.
Figure 6:
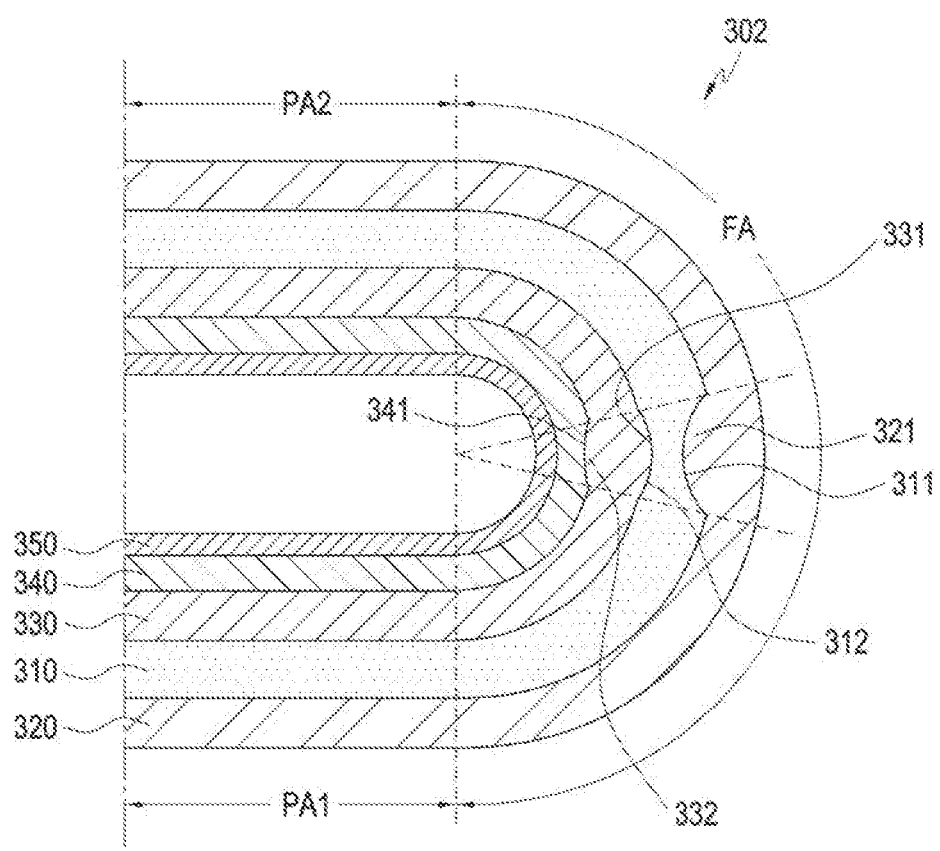
FIG. 6 is a cross-sectional view of a display of an electronic device in a folded state, according to an embodiment.
Figure 7:
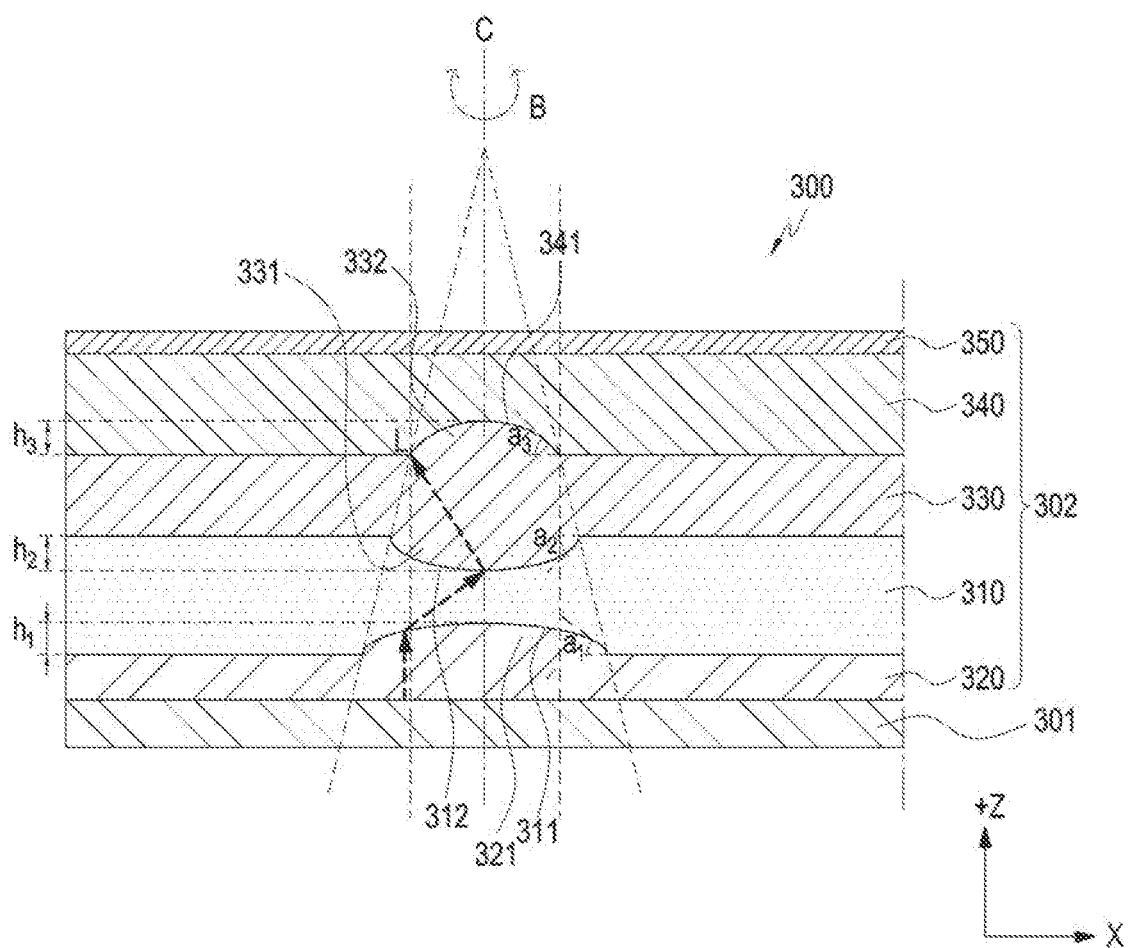
FIG. 7 is a view illustrating the structure of the flexible window of the display in FIG. 5, according to an embodiment.

FIG. 5 is a cross-sectional view of a display of an electronic device in an unfolded state according to an embodiment. FIG. 6 is a cross-sectional view of a display of an electronic device in a folded state according to an embodiment. FIG. 7 is a view for explaining the structure of the flexible window of the display in FIG. 5.

The configuration of a display 300 in FIG. 5 to FIG. 7 may be entirely or partially the same as the configuration of the display device in FIG. 1 and/or the display 240 in FIG. 2 to FIG. 4. The configuration of a display panel 301 in FIG. 5 to FIG. 7 may be entirely or partially the same as the configuration of the display panel 245 in FIG. 4. The configuration of a flexible window 302 in FIG. 5 to FIG. 7 may be entirely or partially the same as the configuration of the flexible window 247 in FIG. 4.

Referring to FIG. 5 to FIG. 7, in an embodiment, a display 300 may include a display panel 301 and a flexible window 302.

In an embodiment, the flexible window 302 may be disposed on an outer side surface (the surface in the +Z-direction) of the display panel 301 so as to protect the display panel 301 from an external environment. According to an embodiment, the flexible window 302 may mean a window of which at least a partial area can be bent and deformed or folded and deformed between a flat surface or a curved surface. For example, the flexible window 302 may include flexible glass (e.g., a glass layer 310). In an embodiment, although an example, in which the flexible window 302 is bent and deformed or folded and deformed (hereinafter referred to as "bending deformation"), is disclosed, the flexible window is not limited thereto. In an embodiment, the flexible window 302 may be rolled and deformed and/or stretched and deformed.

Referring to FIG. 6, in an embodiment, the flexible window 302 may include a deformation area FA and at least one flat-surface area PA1 or PA2 extending to at least one side of the deformation area FA. In an embodiment, the area of the flexible window 302 may be divided by the deformation area FA extending along an axis (e.g., the axis Y) or a folding axis (e.g., the folding axis A in FIG. 2). According to an embodiment, the longitudinal direction or the extension direction (e.g., the Y-axis direction) of the deformation area FA may be substantially parallel to at least one folding axis (e.g., the folding axis A in FIG. 2). According to an embodiment, the flexible window 302 may include a first flat-surface area PA1 extending to one side (e.g., to the left side of the deformation area FA or in the −X-direction illustrated in FIG. 5) of the deformation area FA, and the second flat-surface area PA2 extending to the other side (e.g., to the right side of the deformation area FA or in the +X-direction illustrated in FIG. 5). According to an embodiment, the first flat-surface area PA1 and the second flat-surface area PA2 may have a substantially symmetrical shape with reference to at least one folding axis (e.g., the folding axis A in FIG. 2).

According to an embodiment, at least a part of the deformation area FA of the flexible window 302 may be disposed in a folding area (e.g., the folding area 243 in FIG. 2 and FIG. 4) of the display 300. For example, at least a part of the first flat-surface area PA1 of the flexible window 302 may be disposed in a first display area (e.g., the first display area 241 in FIG. 2 and FIG. 4) of the display 300. For example, at least a part of the second flat-surface area PA2 of the flexible window 302 may be disposed in a second display area (e.g., the second display area 242 in FIG. 2 and FIG. 4) of the display 300. However, the division of the area (e.g., FA PA1, PA2) of the flexible window 302 according to an embodiment may be exemplary, and the flexible window 302 may be divided into multiple (e.g., two or more) areas according to the structure or function thereof. For example, in an embodiment, the area of the flexible window 302 may be divided with reference to another folding area (e.g., a folding area parallel to the axis X) or another folding axis (e.g., a folding axis parallel to the axis X).

According to an embodiment, the deformation area FA may be deformed based on the movement of an electronic device (e.g., the electronic device 101 in FIG. 2 to FIG. 4). For example, at least a part of the deformation area FA may be deformed between a flat-surface shape and a curved-surface shape. For example, if an electronic device is in a folded state (e.g., FIG. 3) or an intermediate state, at least a part of the deformation area FA may be bent and deformed into a curved-surface shape. For example, if at least a part of the deformation area FA is deformed to form a curved-surface shape, a folding axis (e.g., the folding axis A in FIG. 2) may be substantially parallel to the curvature center of the curved-surface shape of the deformation area FA. For example, the flat-surface areas PA1 and PA2 may be maintained in a flat-plate or a flat-surface shape regardless of the movement of an electronic device (e.g., the electronic device 101 in FIG. 2 to FIG. 4).

In an embodiment, the flexible window 302 may be folded in based on rotation of a hinge module (e.g., the hinge module 202 in FIG. 4). For example, the flexible window 302 may be bent in the direction of an arrow B indicated in FIG. 5 or FIG. 7. According to an embodiment, if an electronic device is in a folded state (e.g., FIG. 3), one surface (the surface in the +Z-direction) of the flexible window 302 may be disposed inside an electronic device (e.g., the electronic device 101 in FIG. 2 to FIG. 4). For example, if an electronic device is in a folded state (e.g., FIG. 3), at least a part of one surface (e.g., the surface of the +Z-direction) of the first flat-surface area PA1 may face at least a part of one surface (e.g., the surface of the +Z-direction) of the second flat-surface area PA2. For example, if an electronic device is in unfolded state (e.g., FIG. 2), one surface (e.g., the surface of the +Z-direction) of the first flat-surface area PA1 and one surface (e.g., the surface of the +Z-direction) of the second flat-surface area PA2 may be arranged to be oriented in substantially the same direction.

According to an embodiment, if the flexible window 302 is folded in, one surface of the deformation area FA may become a compression surface on which compressive stress mainly acts, and the other surface opposite to the one surface may become a tension surface on which tensile stress mainly acts. For example, the compression surface may refer to as one surface (e.g., the surface of the +Z-direction) of the deformation area FA, which faces the outside of an electronic device (e.g., the electronic device 101 in FIG. 2 to FIG. 4). For example, the tension surface may refer to as the other surface (e.g., the surface of the −Z-direction) facing the display panel 301. For example, the internal stress in the deformation area FA may be concentrated on the compression surface and the tension surface, and thus a crack by local plastic deformation or a fold mark may be recognized in the deformation area FA of the flexible window 302.

According to an embodiment, a display 300 including the flexible window 302 is folded in, but the folding direction of the display 300 is not limited thereto. For example, the display 300 including the flexible window 302, which will be described later with reference to FIG. 8, may be folded out. In an embodiment, the display 300 including the flexible window 302 may be folded in and folded out.

In an embodiment, the deformation area FA, the first flat-surface area PA1, and/or the second flat-surface area PA2 of the flexible window 302 may include a glass layer 310, at least one polymer layer 320 or 340, an adhesive layer 330, and/or a coating layer 350.

In the document, the shapes of the embossed structures (e.g., the curved-surface portions 311 and 312 or the uneven structures 321, 331, 332, and 341), which are formed on the glass layer 310, the polymer layers 320 and 340, the adhesive layer 330, and the coating layer 350, may be referred to as a "convex shape" and/or a "concave shape". In the document, the "convex shape" may mean a shape in which the curved-surface portions 311 and 312 or the uneven structures 321, 331, 332, and 341 protruded from one surface, on which the curved-surface portions or the uneven structures are formed, toward the other surface which faces the one surface and/or is in contact with another layer (e.g., the glass layer 310, the polymer layers 320 and 340, the adhesive layer 330, or the coating layer 350). In the document, the "concave shape" may mean a shape in which the curved-surface portions 311 and 312 or the uneven structures 321, 331, 332, and 341 are formed in an embossed shape of being dented from one surface of a corresponding layer, on which the curved-surface portions or the uneven structures are formed, toward the other surface of the corresponding layer, which faces the opposite direction to the one surface of the corresponding layer.

In an embodiment, the glass layer 310 may be disposed between the outside of the display 300 and the display panel 301. For example, at least a part of light emitted from the display panel 301 may pass through the glass layer 310. For example, at least a part of the glass layer 310 may be formed as a transparent area (e.g., of glass and/or transparent plastic). According to an embodiment, the glass layer 310 may include flexible glass. For example, the flexible glass may include foldable thin glass (FTG) and/or ultra-thin glass (UTG).

In an embodiment, the glass layer 310 may include at least one curved-surface portion 311 or 312 disposed in the deformation area FA of the flexible window 302. According to an embodiment, the curved-surface portions 311 or the curved-surface portions 312 may be concavely formed on one surface of the glass layer 310 and may extend along one direction (e.g., the Y-axis direction). For example, the curved-surface portions 311 and 312 may be formed on a surface of the glass layer by partially etching after being masked or polishing after etching. According to an embodiment, the glass layer 310 may include the first curved-surface portion 311 and the second curved-surface portion 312 formed on surfaces (the surfaces in the Z-axis direction) facing in opposite directions, respectively. According to an embodiment, the curved-surface portions 311 and 312 may overlap or be aligned with each other, based on an axis (e.g., the axis Z). For example, the first curved-surface portion 311 and/or second curved-surface portion 312 may have a shape symmetrical with reference to an axis C in FIG. 5 and FIG. 7, which is an imaginary axis, but is not limited thereto. For example, the axis C may be substantially parallel to the axis Z. According to an embodiment, the curved-surface portions 311 and 312 may be formed to extend along the folding axis A on which internal stress due to bending deformation is most concentrated. For example, the first curved-surface portion 311 and/or the second curved-surface portion 312 may be positioned at the central part of the deformation area FA of the flexible window 302. According to an embodiment, the concave shape of the curved-surface portion 311 or 312 may have a structure increasing the surface area or width (e.g., the width in the X-axis direction) of the glass layer 310, compared to a flat shape, and may distribute the internal stress acting on the corresponding area. Therefore, it may be possible to alleviate the stress concentration on the tension surface or the compression surface of the deformation area FA. Accordingly, local deformation or breakage of the glass layer 310 due to the stress concentration may be suppressed.

According to an embodiment, a refractive index of the curved-surface portion 311 or 312 of the glass layer 310 may be different from refractive indices of the remaining portions thereof. For example, a material (e.g., glass) constituting the glass layer 310 may have a refractive index greater than those of materials constituting the polymer layers 320 and 340, the adhesive layer 330, and/or the coating layer 350 to be described later. For example, the glass layer 310 may be a high refractive index layer having an average refractive index between about 1.4 and about 1.9. For example, the polymer layers may be low refractive index layers having an average refractive index of between about 1 and about 1.3. For example, the adhesive layer 330 may be a low refractive index layer having an average refractive index between about 1 and about 1.3. However, the range of the refractive index value of each of layers 310, 320, 330, and 340 described above may be merely an example, and may be changed according to the material constituting each of layers 310, 320, 330, and 340 and/or the shape of each of layers 310, 320, 330, and 340.

In an embodiment, the first curved-surface portion 311 (or the first uneven structure 321 of the first polymer layer 320) of the glass layer 310 may have a shape having a low curvature compared to the third uneven structure 332 (or the fourth uneven structure 341 of the second polymer layer 340) of the adhesive layer 330. For example, if a height (e.g., the height in the Z-axis direction) and/or an angle of the curved-surface portion 311 or 312 or the uneven structures 321, 331, 332, and 341 decreases, the refractive index of light passing therethrough may decrease. On the other hand, if a height (e.g., the height in the Z-axis direction and/or an angle of the curved-surface portion 311 or 312 or the uneven structures 321, 331, 332, and 341) increases, the refractive index of light passing therethrough may increase. Here, the height and the angle may be proportional to each other. Referring to FIG. 7, in an embodiment, a height h1 and an angle a1 of the first curved-surface portion 311 (or the first uneven structure 321 of the first polymer layer 320) of the glass layer 310 may be smaller than a height h3 and an angle a3 of the third uneven structure 332 (or the fourth uneven structure 341 of the second polymer layer 340) of the adhesive layer 330.

In an embodiment, a height h2 and an angle a2 of the second curved-surface portion 312 (or the second uneven structure 331 of the adhesive layer 330) of the glass layer 310 may be substantially the same as or similar to, or smaller than the height h1 and the angle a1 of the first curved-surface portion 311 (or the first uneven structure 321 of the first polymer layer 320) of the glass layer 310.

In an embodiment, the third uneven structure 332 (or the fourth uneven structure 341 of the second polymer layer 340) of the adhesive layer 330 may have a shape having a high curvature compared to the shape of the first curved-surface portion 311 (or the first uneven structure 321 of the first polymer layer 320) of the glass layer 310. For example, referring to FIG. 7, the height h3 and the angle a3 of the third uneven structure 332 (or the fourth uneven structure 341) may be greater than the height h1 and the angle a1 of the first curved-surface portion 311 (or the first uneven structure 321). For example, the height h3 and the angle a3 of the third uneven structure 332 (or the fourth uneven structure 341) may be greater than the height h2 and the angle a2 of the second curved-surface portion 312 (or the second uneven structure 331).

However, the relative relationship between the height and the angle of the curved-surface portion 311 or 312 and/or the uneven structure 321, 331, 332, or 341 described above may be merely an example, and is not limited thereto. According to an embodiment, the shape of the curved-surface portion 311 or 312 and/or the uneven structure 321, 331, 332, or 341 may compensate for differences in a thickness and a refractive index between different layers. Accordingly, the optical distortion caused by the difference in a thickness and a refractive index and a phenomenon in which each layer is visually recognized with the naked eye may be suppressed. According to an embodiment, light emitted from the display panel 301 toward the curved-surface portions 311 and 312 and the uneven structures 321, 331, 332, and 341 may be induced to the path of an arrow L illustrated in FIG. 7.

According to an embodiment, the first curved-surface portion 311 may be formed on one surface (the surface in the −Z-direction surface) of the glass layer 310, which corresponds to the tension surface. The second curved-surface portion 312 may be formed on the other surface (the surface of the +Z-direction surface) of the glass layer 310, which corresponds to the compression surface. According to an embodiment, the widths (the widths in the X-axis direction) of the curved-surface portions 311 and 312 may be different from each other. Referring to FIG. 5, according to an embodiment, a width d1 of the first curved-surface portion 311 disposed on the tension surface may be greater than a width d2 of the second curved-surface portion 312 disposed on the compression surface.

Referring to FIG. 5, in an embodiment, a thickness (the thickness in the Z-axis direction) of the glass layer 310 may be different for each portion thereof. According to an embodiment, the average thickness of the curved-surface portion 311 or 312 may be formed to be smaller than a thickness t2 of the remaining portions. By the thickness difference, repulsive power for bending deformation may be different in the curved-surface portions 311 and 312 of the deformation area FA and the remaining portions thereof. For example, the repulsive power in the curved-surface portions 311 and 312 may be relatively smaller than the repulsive power in the remaining portions of the deformation area FA.

According to an embodiment, the curved-surface portions 311 and 312, which are folded along a folding axis (e.g., the folding axis A in FIG. 2) and thus have the greatest internal stress, may be formed to have a minimum thickness t1, so as to improve flexibility and reduce repulsive power. According to an embodiment, other portions of the glass layer 310 except for the curved-surface portions 311 and 312 may be formed to have the thickness t2 sufficiently thicker than the thickness t1 so as to secure the rigidity of the glass layer 310. For example, portions of the curved-surface portions 311 and 312, which are connected to other portions of the glass layer 310, may be formed as a curved surface. Accordingly, the visibility of the glass layer 310 due to the thickness difference may be reduced.

According to an embodiment, the thickness of the glass layer 310 may be about 30 micrometers (μm) to about 50 micrometers. However, the thickness of the glass layer 310 is not limited, and for example, the glass layer 310 may be formed to have a thickness of up to about 250 micrometers so as to enhance rigidity thereof, and thus may be configured to secure flexibility for deformation.

However, the shape of the curved-surface portions 311 and 312 of the glass layer 310 is not limited to the above-described embodiments. In an embodiment, the curved-surface portions 311 and 312 may have a convex shape. For example, the curved-surface portions 311 and 312 having a convex shape may be coupled to or integrally formed with the glass layer 310 having a flat-plate shape. According to an embodiment, the average thickness of the curved-surface portion 311 or 312 may be thicker than the thickness t2 of other portions of the glass layer 310. For example, the curved-surface portions 311 and 312 of a convex shape may be configured to reduce repulsive power for bending deformation and to secure flexibility, compared to other portions of the glass layer 310.

In an embodiment, the flexible window 302 may include multiple polymer layers 320 and 340. According to an embodiment, the polymer layers 320 and 340 may include a first polymer layer 320 disposed between the display panel 301 and the glass layer 310, and/or a second polymer layer 340. The glass layer 310 may be disposed between the first polymer layer 320 and the second polymer layer 340. According to an embodiment, the first polymer layer 320 may be laminated on one surface (the surface in the +Z-direction) of the display panel 301. For example, the glass layer 310 may be coupled to the display panel 301 by means of the first polymer layer 320. According to an embodiment, the second polymer layer 340 may be disposed on the upper part (in the +Z-direction) of the glass layer 310 while having the adhesive layer 330 interposed therebetween. According to an embodiment, the thickness of the polymer layers 320 and 340 may be about 30 micrometers to about 50 micrometers. According to an embodiment, at least a partial area of the polymer layers 320 and 340 may be substantially transparent. For example, the polymer layers may include polyethylene terephthalate (PET), polycarbonate (PC), polymethyl methacrylate (PMMA), and/or thermoplastic polyurethane (TPU). However, the number, arrangement, and/or constituent material of the polymer layers described above may be merely an example, and is not limited.

In an embodiment, the first polymer layer 320 may include at least one uneven structure (e.g., the first uneven structure 321) on at least one surface thereof, which is disposed in the deformation area FA. According to an embodiment, the first polymer layer 320 may include the first uneven structure 321 on the one surface (the surface in the +Z-direction) thereof, which has a shape engaged with the first curved-surface portion 311 of the glass layer 310. According to an embodiment, the first curved-surface portion 311 of the glass layer 310 may have a concave shape, and the first uneven structure 321 of the first polymer layer 320 may have a convex shape engaged with the concave shape. In an embodiment, the first uneven structure 321 may extend along at least one folding axis (e.g., the folding axis A in FIG. 2). For example, the first uneven structure 321 may have a shape symmetrical with reference to the axis C in FIG. 5 and FIG. 7, which is an imaginary axis and is substantially parallel to the axis Z, but is not limited thereto.

According to an embodiment, a width (the width in the X-axis direction) and a height (the height in the Z-axis direction) of the first uneven structure 321 may be substantially the same as or similar to a width (the width d3 in FIG. 5) and a height (the height h3 in FIG. 7) of the first curved-surface portion 311 of the glass layer 310. In an embodiment, the first uneven structure 321 may include a spherical surface and/or a non-spherical surface. For example, the first uneven structure 321 may have a curvature substantially identical or similar to the curvature of the first curved-surface portion 311.

In an embodiment, the adhesive layer 330 may be disposed between the glass layer 310 and the second polymer layer 340. For example, the adhesive layer 330 may include a material which is more flexible than the glass layer 310 and the second polymer layer 340. For example, the adhesive layer 330 may transmit at least a part of light emitted from the display panel 301. For example, at least a partial area of the adhesive layer 330 may be substantially transparent. According to an embodiment, the adhesive layer 330 may include an optically clear adhesive (OCA) and/or an optically clear resin (OCR). For example, the adhesive layer 330 may be formed by applying a liquid adhesive and/or resin to one surface (e.g., the surface in the +Z-direction surface) of the glass layer 310 and then curing same with UV light. For example, a material of the adhesive layer 330 may be changed in consideration of optical performance, such as light transmittance and refractive index, and/or required strength.

In an embodiment, the adhesive layer 330 may include at least one uneven structure 331 or 332 disposed in the deformation area FA. In an embodiment, the adhesive layer 330 may include a second uneven structure 331 formed on one surface (the surface of the −Z-direction) thereof, and a third uneven structure 332 formed on the other surface (the surface of the +Z-direction). For example, the second uneven structure 331 may be engaged with the second curved-surface portion 312 of the glass layer 310. For example, the third uneven structure 332 may be engaged with the fourth uneven structure 341 of the second polymer layer 340. According to an embodiment, the second uneven structure 331 and/or the third uneven structure 332 may have a convex shape, and the convex shape may be engaged with the concave shape of the second curved-surface portion 312 and/or the fourth uneven structure 341. However, the shape of the uneven structures 331 and 332 and the curved-surface portions 311 and 312 are not limited to the above-described embodiment. For example, the second uneven structure 331 and/or the third uneven structure 332 may include a concave shape, and the concave shape may be engaged with the convex shape of the second curved-surface portion 312 and/or the fourth uneven structure 341.

According to an embodiment, the second uneven structure 331 may be formed on one surface (the surface of the −Z-direction) of the adhesive layer 330, which corresponds to the tension surface. The third uneven structure 332 may be formed on the other surface (the surface of the +Z-direction) of the adhesive layer 330, which corresponds to the compression surface. According to an embodiment, the widths (the widths in the +Z-direction) of the second uneven structure 331 and the third uneven structure 332 may be different from each other. Referring to FIG. 5, the width d2 of the second uneven structure 331 disposed on the tension surface may be greater than a width d3 of the third uneven structure 332 disposed on the compression surface.

Referring to FIG. 5 to FIG. 7, in an embodiment, the second uneven structure 331 and/or the third uneven structure 332 of the adhesive layer 330 may include a spherical surface. For example, the spherical surface of the second uneven structure 331 and/or the third uneven structure 332 may have a predetermined curvature. In an embodiment, the curvature of the second uneven structure 331 may be substantially the same as or similar to the curvature of the second curved-surface portion 312 of the glass layer 310. In an embodiment, the curvature of the third uneven structure 332 may be substantially the same as or similar to the fourth uneven structure 341 of the second polymer layer 340. In an embodiment, the second uneven structure 331 and/or the third uneven structure 332 may be formed as a spherical surface as a whole. However, the shape of the curved-surface portions 311 and 312 are not limited to the spherical surface shape as the above-described example, and for example, at least a part of the second uneven structure 331 and/or the third uneven structure 332 may have a non-spherical surface shape.

In an embodiment, the third uneven structure 332 (or the fourth uneven structure 341 of the second polymer layer 340) of the adhesive layer 330 may have a shape having a higher curvature compared to the shape of the first curved-surface portion 311 (or the first uneven structure 321 of the first polymer layer 320) of the glass layer 310. For example, referring to FIG. 7, the height h3 and the angle a3 of the third uneven structure 332 (or the fourth uneven structure 341) may be greater than the height h1 and the angle a1 of the first curved-surface portion 311 (or the first uneven structure 321). For example, the height h3 and the angle a3 of the third uneven structure 332 (or the fourth uneven structure 341) may be greater than the height h2 and the angle a2 of the second curved-surface portion 312 (or the second uneven structure 331). For example, the shape of the second uneven structure 331 and the third uneven structure 332 of the adhesive layer 330 may compensate for differences in a thickness and a refractive index between the glass layer 310 and the second polymer layer 340.

In an embodiment, the second polymer layer 340 may include at least one uneven structure (e.g., the fourth uneven structure 341) on at least one surface thereof, which is disposed in the deformation area FA. According to an embodiment, the first polymer layer 320 may include the fourth uneven structure 341 on the one surface (the surface in the −Z-direction) thereof, which has a shape engaged with the third curved-surface portion 332 of the adhesive layer 330. According to an embodiment, the third uneven structure 332 of the adhesive layer 330 may have a convex shape, and the fourth uneven structure 341 of the second polymer layer 340 may have a concave shape engaged with the convex shape. In an embodiment, the fourth uneven structure 341 may extend along at least one folding axis (e.g., the folding axis A in FIG. 2). For example, the fourth uneven structure 341 may have a shape symmetrical with reference to the axis C in FIG. 5 and FIG. 7, which is an imaginary axis and is substantially parallel to the axis Z, but is not limited thereto.

For example, a width (the width in the X-axis direction) and a height (the height in Z-axis direction) of the third uneven structure 332 may be substantially the same as or similar to the width (width d3 in FIG. 5) and the height (the height h3 in FIG. 7) of the fourth uneven structure 341. In an embodiment, the fourth uneven structure 341 may include a spherical surface and/or a non-spherical surface. For example, the fourth uneven structure 341 may have a curvature substantially identical or similar to the curvature of the third uneven structure 332.

In an embodiment, in connection with the coating layer 350, the coating layer 350 may be disposed on the outermost side of the display 300. According to an embodiment, the coating layer may be laminated on one surface (e.g., the surface of the +Z-direction) of the second polymer layer 340. For example, the coating layer 350 may have a hard coating layer for improving strength of the display 300.

According to an embodiment, the curved-surface portions 311 and 312 or the uneven structures 321, 331, 332, and 341 may at least partially overlap or be aligned with each other, based on an axis (e.g., the axis C or the axis Z). According to an embodiment, the laminated structure of the flexible window 302 is not limited to the above-described example. For example, the flexible window 302 may further include an additional layer (e.g., a polymer layer or an adhesive layer) disposed on one side (e.g., in the +Z-direction or the −Z-direction) of the glass layer 310, and the additional layer may include additional uneven structures having a concave or a convex shape. For example, the additional uneven structures may at least partially overlap or be aligned with each other with reference to an axis (e.g., the axis C or the axis Z) as the curved-surface portions 311 and 312 or the uneven structures 321, 331, 332, and 341. For example, the additional uneven structures may reduce optical distortion due to the difference in a thickness and a refractive index between each layer, and may help distribution of internal stress during bending deformation, together with the above-described curved-surface portions 311 and 312 or the uneven structures 321, 331, 332, and 341.

Figure 8:
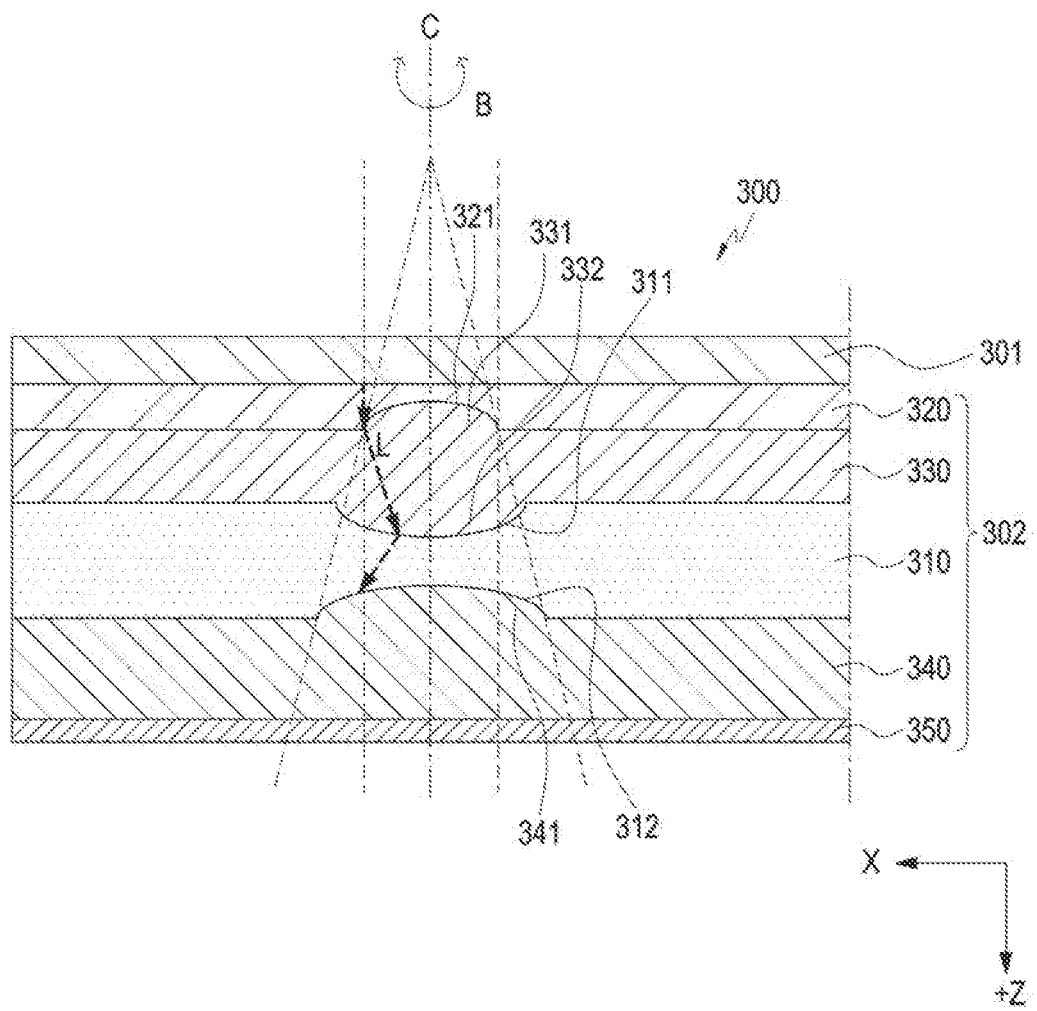
FIG. 8 is a cross-sectional view of a display capable of folding out, according to an embodiment.

FIG. 8 is a cross-sectional view of a display capable of folding out according to an embodiment.

The display 300 in FIG. 8 may refer to the display 300 in FIG. 5 to FIG. 7. The configurations of the flexible window 302 and the display panel 301 in FIG. 8 may be entirely or partially the same as the configurations of the flexible window 302 and the display panel 301 in FIG. 5 to FIG. 7.

Referring to FIG. 8, in an embodiment, the display 300 may be folded out in the direction of an arrow B in FIG. 8. According to an embodiment, if an electronic device is in a folded state (e.g., FIG. 3), one surface (e.g., the surface in the +Z-direction of the coating layer 350) of the flexible window 302 may be exposed to the outside of the electronic device. For example, if an electronic device is in a folded state (e.g., FIG. 3), one surface (e.g., the surface of the +Z-direction) of the first flat-surface area PA1 and one surface (e.g., the surface of the +Z-direction) of the second flat-surface area PA2 may be arranged to face in opposite directions. For example, a compression surface (e.g., the deformation area FA) of the flexible window 302 may refer to as one surface (e.g., the surface in the −Z-direction) facing the display panel 301, and a tension surface may refer to as one surface (e.g., the surface in the +Z-direction) facing the outside of an electronic device (e.g., the electronic device 101 in FIG. 2 to FIG. 4).

The display 300 in FIG. 8 may be partially different from the display 300 in FIG. 5 to FIG. 7 in the arrangement of each layer constituting the stacked structure. Referring to FIG. 8, in an embodiment, the first polymer layer 320, the adhesive layer 330, the glass layer 310, the second polymer layer 340, and the coating layer 350 may be sequentially laminated on one surface (the surface in the +Z-direction surface) of the display panel 301 (e.g., the display panel 301 in FIG. 5, FIG. 6 and FIG. 7).

According to an embodiment, the first uneven structure 321 formed on one surface (e.g., the surface in +Z-direction) of the first polymer layer 320 may be engaged with the second uneven structure 331 formed on one surface (e.g., the surface in −Z-direction) of the adhesive layer 330. According to an embodiment, the third uneven structure 332 formed on one surface (e.g., the surface in the +Z-direction) of the adhesive layer 330 may be engaged with the first curved-surface portion 311 formed on one surface (e.g., the surface in the −Z-direction) of the glass layer 310. According to an embodiment, the second curved-surface portion 312 formed on one surface (e.g., the surface in the +Z-direction) of the glass layer 310 may be engaged with the fourth uneven structure 341 formed on one surface (e.g., the surface in the −Z-direction) of the second polymer layer 340. According to an embodiment, the first uneven structure 321, the first curved-surface portion 311, and the second curved-surface portion 312 may have a concave shape, and the second uneven structure 331, the third uneven structure 332, and the fourth uneven structure 341 may have a convex shape. However, the shape of the first curved-surface portion 311, the second curved-surface portion 312, the first uneven structure 321, the second uneven structure 331, the third uneven structure 332, and/or the fourth uneven structure 341 is not limited to the above-described embodiment. The above-described configuration of the display 300 in FIG. 5 to FIG. 7 except for the above-mentioned laminated structure may be identically or similarly applied to the display 300 of FIG. 8.

Figure 9:
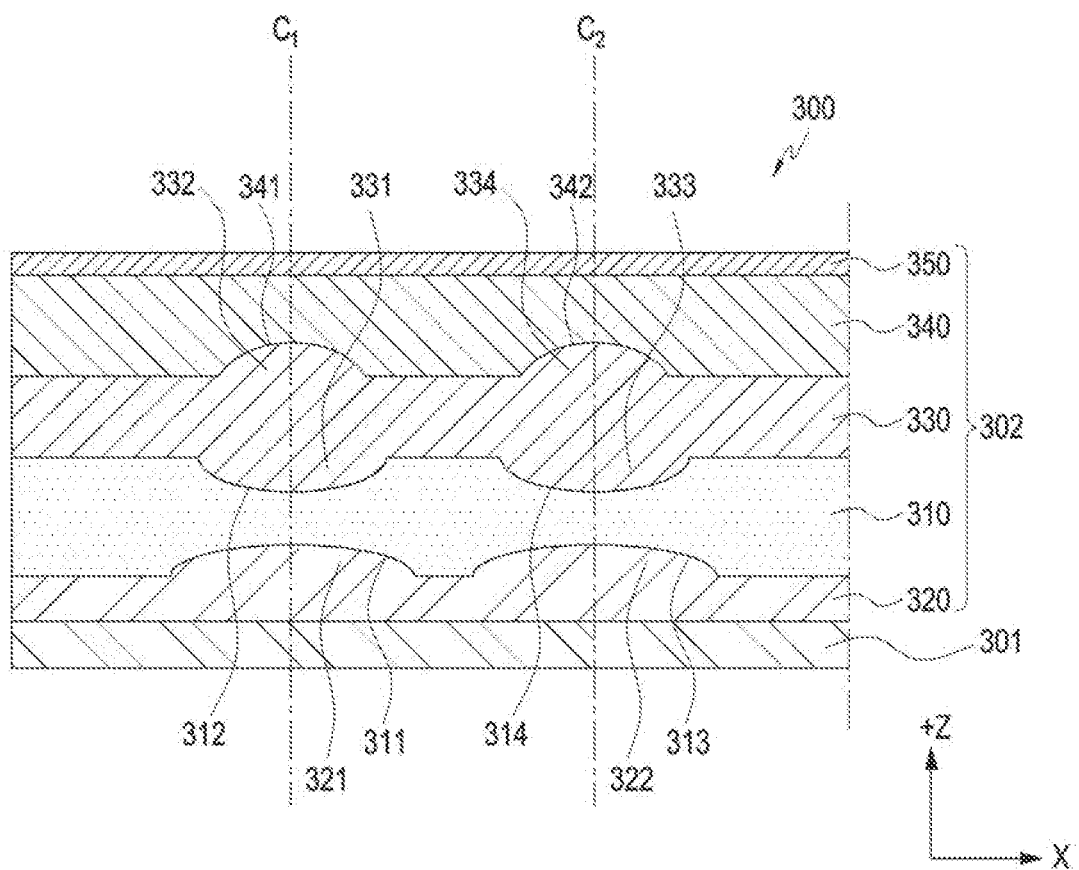
FIG. 9 is a cross-sectional view of a display, according to an embodiment.

FIG. 9 is a cross-sectional view of a display according to an embodiment.

The display 300 in FIG. 9 may refer to the display 300 in FIG. 5 to FIG. 7 and/or the display 300 in FIG. 8. The configurations of the flexible window 302 and the display panel 301 in FIG. 9 may be entirely or partially the same as the configurations of the flexible window 302 and the display panel 301 in FIG. 5 to FIG. 7 and/or the configurations of the flexible window 302 and display panel 301 in FIG. 8. An embodiment to be described with reference to FIG. 9 is not exclusive to an embodiment of FIG. 8, and may be combined therewith.

In an embodiment, the flexible window 302 may be provided with multiple (e.g., two) first curved-surface portions 311, second curved-surface portions 312, first uneven structures 321, second uneven structures 331, third uneven structures 332, and/or fourth uneven structures 341 which are arranged in the deformation area FA. According to an embodiment, an electronic device (e.g., the electronic device 101 in FIG. 2 to FIG. 4) may include one folding axis (e.g., the folding axis A in FIG. 2) and another folding axis substantially parallel thereto. For example, the first curved-surface portions 311, the second curved-surface portions 312, the first uneven structures 321, the second uneven structures 331, the third uneven structures 332, and/or the fourth concave-convex structures 341 may be formed to extend along a folding axis (e.g., the folding axis A in FIG. 2) of an electronic device (e.g., the electronic device 101 in FIG. 2 to FIG. 4). For example, the first curved-surface portions 313, the second curved-surface portions 314, the first uneven structures 323, the second uneven structures 334, the third uneven structures 333, and/or the fourth concave-convex structures 344 may be formed to extend along another folding axis substantially parallel to the folding axis (e.g., the folding axis A in FIG. 2) of an electronic device (e.g., the electronic device 101 in FIG. 2 to FIG. 4).

According to an embodiment, one pair of first curved-surface portions 311 and 313, second curved-surface portions 312 and 314, first uneven structures 321 and 322, second uneven structures 331 and 333, third uneven structures 332 and 334, and/or fourth uneven structures 341 and 342 may be substantially identical to each other. For example, each of the curved-surface portions 311, 312, 313, and 314 and/or each of the uneven structures 321, 322, 331, 332, 333, 334, 341, and 342 may have a shape symmetrical with reference to the imaginary axis C1 or C2 illustrated in FIG. 9. For example, the imaginary axis C1 or C2 may be substantially parallel to each other, and substantially parallel to the axis Z. However, the number and direction of the folding axis of an electronic device (e.g., the electronic device 101 in FIG. 2 to FIG. 4) are not limited to the above-described embodiment.

The flexible window according to an embodiment may be applied to various form factors (e.g., an in-folding type foldable electronic device, an out-folding type foldable electronic device, a rollable electronic device, etc.) including a foldable electronic device. The display according to an embodiment may be applied to various displays such as a curved display, a bendable display, a rollable display, and a stretchable display in addition to a foldable display.

The flexible window applied to the foldable electronic device should be configured such that folding marks do not remain even after repeated folding, image quality is not degraded, and also, durability is essentially high so as not to be damaged from physical and chemical impacts applied to the display. However, in a foldable or rollable flexible display and/or an electronic device including same, it may be difficult to stably protect the display panel while having the flexibility to the extent which enables the flexible window to be deformed. For example, if the thickness of the flexible window is thickened to increase the rigidity, it may be difficult to be fold and be difficult to be used in a foldable electronic device. Particularly, in case of a flexible window applied to a foldable electronic device, internal stress is concentrated in a deformation area formed along a folding axis, and deformation such as a crack may be visually recognized along a folding axis if bending deformation is repeated. In addition, a general flexible window may be configured to include multiple layers on the upper part or the lower part of the glass layer so as to protect the glass layer and improve optical performance. There may be a difference in a thickness between the multiple layers and in a refractive index between constituent materials of each layer. The differences in a thickness and a refractive index between the layers may cause physical and optical distortion, and the layers may be visually recognized with the naked eye.

An embodiment may be to at least solve the above-mentioned problems and/or disadvantages and to at least provide the advantages to be described later, and may provide a flexible window deformable between a flat-surface shape and a curved-surface shape, and an electronic device including same.

An embodiment may provide a display including a flexible window in which a curved-surface structure or a uneven structure, which has a concave or a convex shape and is disposed in a deformation area, is formed on each layer, including a glass layer, of the flexible window, and the curved-surface structure or the uneven structure is formed to have a width greater as going from a compression surface to a tension surface, thereby distributing the internal stress in the deformation area by compression-bending deformation, and an electronic device including same.

An embodiment may provide a display including a flexible window in which a height or an angle of a curved-surface structure or a uneven structure formed on each of the layers is adjusted to suppress physical and optical distortion caused by the difference in a refractive index and a thickness and improve visibility in order to compensate for a difference in a refractive index and a thickness between multiple layers, including a glass layer, of the flexible window, and an electronic device including same.

According to an embodiment, a curved-surface structure or a uneven structure distributing stress may be formed on each of the layers, including the glass layer, of the flexible window so as to alleviate the concentration of internal stress during bending deformation and suppress cracks or breakage of a flexible window (e.g., a glass layer) due to repeated deformation.

An electronic device (e.g. 101 in FIG. 1 to FIG. 4) according to an embodiment may include a first housing (210 in FIG. 2 to FIG. 4), a second housing (220 in FIG. 2 to FIG. 4) rotatably connected to the first housing, a flexible display panel (245 in FIGS. 4 and 301 in FIG. 5 and FIG. 7 to FIG. 9) connected to the first housing and the second housing, and a flexible window (247 in FIGS. 4 and/or 302 in FIG. 5 to FIG. 9). The flexible window may be coupled to one surface (e.g., the surface in the +Z-direction) of the flexible display panel. The flexible window may include a deformation area which is deformable together with the flexible display panel around at least one folding axis (A in FIG. 2), based on a rotation of the second housing. The flexible window may include a glass layer (310 in FIG. 5 to FIG. 9), a first polymer layer (320 in FIG. 5 to FIG. 9) disposed between the glass layer and the flexible display panel, an adhesive layer (330 in FIG. 5 to FIG. 9) laminated on a second surface of the glass layer, and/or a second polymer layer (340 FIG. 5 to FIG. 9) laminated on the adhesive layer. The glass layer may include at least one first curved-surface portion (311 in FIG. 5 to FIG. 9 or 313 in FIG. 9) formed on a first surface (e.g., the surface in the −Z-direction) facing one surface of the flexible display panel and disposed in the deformation area. The glass layer may include at least one second curved-surface portion (312 in FIG. 5 to FIG. 9 or 314 in FIG. 9) formed on a second surface facing the opposite direction to the first surface and at least partially overlapped with the first curved-surface portion. The adhesive layer may include at least one uneven structure (332 in FIG. 5 to FIG. 9 or 324 in FIG. 9) formed on one surface facing the opposite direction to the second surface and at least partially overlapped with the first curved-surface portion or the second curved-surface portion.

In an embodiment, the first curved-surface portion, the second curved-surface portion and/or the uneven structure may be aligned with reference to an axis (C in FIG. 5 to FIG. 8, or C1 or C2 in FIG. 9).

In an embodiment, a width (d1 in FIG. 5) of the first curved-surface portion may be greater than a width (d2 in FIG. 5) of the second curved-surface portion.

In an embodiment, a width of the first curved-surface portion may be greater than a width (d3 in FIG. 5) of the uneven structure.

In an embodiment, the glass layer may include a material having a refractive index higher than that of at least one of the first polymer layer, the second polymer layer, or the adhesive layer.

In an embodiment, at least one of the first curved-surface portion or the second curved-surface portion may have a concave shape.

In an embodiment, at least one of the first polymer layer or the adhesive layer may include at least one uneven structure (321 or 331 in FIG. 5 or 322 or 333 in FIG. 9) having a convex shape engaged with the concave shape of the first curved-surface portion or the second curved-surface portion.

In an embodiment, each of the first curved-surface portion and the second curved-surface portion may have a concave shape, and a height (h3) of the uneven structure is higher than a height (h1, h2) of the concave shape of the first curved-surface portion and the second curved-surface portion.

In an embodiment, the uneven structure may have a convex shape, and the adhesive layer may include a material having a refractive index smaller than the glass layer.

In an embodiment, a height of the concave shape may be less than a height of the convex shape of the uneven structure.

In an embodiment, the uneven structure may have a convex shape, and the second polymer layer may include a structure (341 in FIG. 5 to FIG. 9 or 342 in FIG. 9) having a concave shape engaged with the uneven structure.

In an embodiment, at least one of the first polymer layer, the second polymer layer, or the adhesive layer may include an at least partially transparent area.

In an embodiment, the glass layer may be flexible thin glass.

In an embodiment, a coating layer laminated on the second polymer layer may be included therein.

The display may be folded along the at least one folding axis such that the coating layer is disposed inside the electronic device.

An electronic device (110 in FIG. 1 and/or FIG. 2 to FIG. 4) according to an embodiment may include a first housing (210 in FIG. 2 to FIG. 4), a second housing (220 in FIG. 2 to FIG. 4) rotatably connected to the first housing, a flexible display panel (245 in FIGS. 4 and 301 in FIG. 5 and FIG. 7 to FIG. 9) connected to the first housing and the second housing, and a flexible window (247 in FIGS. 4 and/or 302 in FIG. 5 to FIG. 9). The flexible window may be coupled to one surface (e.g., the surface in the +Z-direction) of the flexible display panel. The flexible window may include a deformation area which is deformable together with the flexible display panel around at least one folding axis (A in FIG. 2), based on a rotation of the second housing. The flexible window may include a glass layer (310 in FIG. 5 to FIG. 9), a first polymer layer (320 in FIG. 5 to FIG. 9) laminated on the one surface of the flexible display panel, an adhesive layer (330 in FIG. 5 to FIG. 9) disposed between the first polymer layer and the first surface of the glass layer, and/or a second polymer layer (340 in FIG. 5 to FIG. 9) laminated on the second surface of the glass layer. The glass layer may include at least one first curved-surface portion (311 in FIG. 5 to FIG. 9 or 313 in FIG. 9) formed on a first surface (e.g., the surface in the −Z-direction) facing one surface of the flexible display panel and disposed in the deformation area. The glass layer may include at least one second curved-surface portion (312 in FIG. 5 to FIG. 9 or 314 in FIG. 9) formed on a second surface facing the opposite direction to the first surface and at least partially overlapped with the first curved-surface portion. The adhesive layer may include at least one uneven structure 331 and at least one uneven structure (332 in FIG. 5 to FIG. 9 or 324 in FIG. 9) formed on one surface facing the first polymer layer and at least partially overlapped with the first curved-surface portion or the second curved-surface portion.

In an embodiment, the first curved-surface portion, the second curved-surface portion and/or the uneven structure may be aligned with reference to an axis (C in FIG. 5 to FIG. 8, or C1 or C2 in FIG. 9). A width of the first curved-surface portion may be greater than a width of the second curved-surface portion and a width of the uneven structure.

In an embodiment, each of the first curved-surface portion and the second curved-surface portion may have a concave shape. The uneven structure may have a convex shape, and a height of the convex shape may be greater than a height of the concave shape.

In an embodiment, a coating layer 350 laminated on the second polymer layer may be included therein. The display may be folded along the at least one folding axis A so that the coating layer is exposed to the outside of the electronic device.

In an embodiment, an electronic device (110 in FIG. 1 and/or FIG. 2 to FIG. 4) according to an embodiment may include a flexible display panel connected to a first housing and a second housing and a flexible window that is deformable together with the flexible display panel around at least one folding axis. The flexible window may comprise a glass layer comprises at least one first curved-surface portion on a first surface of the glass layer, at least one second curved-surface portion on a second surface of the glass layer and an adhesive layer laminated on the second surface of the glass layer. The second surface may face an opposite direction to the first surface and at least partially overlapped with the at least one first curved-surface portion. The adhesive layer may comprise at least one uneven structure formed on one surface that faces an opposite direction to the second surface of the glass layer. The adhesive layer may be at least partially overlapped with the at least one first curved-surface portion or the at least one second curved-surface portion.

In an embodiment, at least two of the at least one first curved-surface portion, the at least one second curved-surface portion, or the at least one uneven structure may be aligned with reference to an axis.

In an embodiment, a width of the at least one first curved-surface portion may be greater than a width of the at least one second curved-surface portion.

In an embodiment, the width of the at least one first curved-surface portion may be greater than a width of the at least one uneven structure.

In an embodiment, the glass layer may comprise a material having a refractive index higher than a refractive index of the adhesive layer.

Effects derived from one or more embodiments are not limited to the above-mentioned effects, and may be variously expanded within a range which does not deviate from the concepts and areas.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a first housing;
    a second housing rotatably connected to the first housing;
    a flexible display panel connected to the first housing and the second housing; and
    a flexible window that is coupled to a surface of the flexible display panel, the flexible window including a deformation area that is deformable together with the flexible display panel around at least one folding axis, based on a rotation of the second housing,
    wherein the flexible window comprises:
        a glass layer comprising:
            at least one first curved-surface portion on a first surface of the glass layer, the first surface facing the one surface of the flexible display panel and disposed within the deformation area, and
            at least one second curved-surface portion on a second surface of the glass layer, the second surface facing an opposite direction to the first surface and at least partially overlapped with the at least one first curved-surface portion;

a first polymer layer disposed between the glass layer and the flexible display panel;

an adhesive layer laminated on the second surface of the glass layer, the adhesive layer comprising at least one uneven structure formed on one surface that faces an opposite direction to the second surface of the glass layer, and is at least partially overlapped with the at least one first curved-surface portion or the at least one second curved-surface portion; and a second polymer layer laminated on the adhesive layer.

2. The electronic device of claim 1, wherein at least two of the at least one first curved-surface portion, the at least one second curved-surface portion, or the at least one uneven structure are aligned with reference to an axis.

3. The electronic device of claim 1, wherein a width of the at least one first curved-surface portion is greater than a width of the at least one second curved-surface portion.

4. The electronic device of claim 1, wherein a width of the at least one first curved-surface portion is greater than a width of the at least one uneven structure.

5. The electronic device of claim 1, wherein the glass layer comprises a material having a refractive index that is higher than a refractive index of at least one of the first polymer layer, the second polymer layer or the adhesive layer.

6. The electronic device of claim 1, wherein at least one of the at least one first curved-surface portion or the at least one second curved-surface portion has a concave shape.

7. The electronic device of claim 6, wherein at least one of the first polymer layer or the adhesive layer comprises at least one uneven structure having a convex shape engaged with the concave shape of the at least one first curved-surface portion or the at least one second curved-surface portion.

8. The electronic device of claim 1, wherein each of the at least one first curved-surface portion and the at least one second curved-surface portion has a concave shape, and a height of the at least one uneven structure is higher than a height of the concave shape of the at least one first curved-surface portion and the at least one second curved-surface portion.

9. The electronic device of claim 8, wherein the at least one uneven structure has a convex shape, and the adhesive layer comprises a material having a refractive index lower than a refractive index the glass layer.

10. The electronic device of claim 9, wherein a height of the concave shape is smaller than a height of the convex shape of the at least one uneven structure.

11. The electronic device of claim 1, wherein the at least one uneven structure has a convex shape, and the second polymer layer comprises a structure having a concave shape engaged with the at least one uneven structure.

12. The electronic device of claim 1, wherein at least one of the first polymer layer, the second polymer layer, or the adhesive layer comprises an at least partially transparent area.

13. The electronic device of claim 1, wherein the glass layer is flexible glass having a thin film shape.

14. The electronic device of claim 1, further comprising a coating layer laminated on the second polymer layer.

15. The electronic device of claim 14, wherein the flexible display panel is configured to be foldable along the at least one folding axis so that the coating layer is disposed inside the electronic device.

16. An electronic device comprising:

a first housing;

a second housing rotatably connected to the first housing;

a flexible display panel connected to the first housing and the second housing; and a flexible window that is coupled to one surface of the flexible display panel, the flexible window including a deformation area that is deformable together with the flexible display panel around at least one folding axis based on a rotation of the second housing, wherein the flexible window comprises:

a glass layer comprising:

at least one first curved-surface portion on a first surface of the glass layer, the first surface facing the one surface of the flexible display panel and disposed within the deformation area, and at least one second curved-surface portion on a second surface of the glass layer, the second surface facing an opposite direction to the first surface and at least partially overlapped with the at least one first curved-surface portion;

a first polymer layer laminated on the one surface of the flexible display panel;

an adhesive layer which is disposed between the first polymer layer and the first surface of the glass layer, the adhesive layer comprising at least one uneven structure formed on one surface that faces the first polymer layer and is at least partially overlapped with the at least one first curved-surface portion or the at least one second curved-surface portion; and a second polymer layer laminated on the second surface of the glass layer.

17. The electronic device of claim 16, wherein at least two of the at least one first curved-surface portion, the at least one second curved-surface portion, or the at least one uneven structure are aligned with reference to an axis.

18. The electronic device of claim 16, wherein a width of the at least one first curved-surface portion is greater than a width of the at least one second curved-surface portion and a width of the at least one uneven structure.

19. The electronic device of claim 16, wherein each of the at least one first curved-surface portion and the at least one second curved-surface portion has a concave shape, and the at least one uneven structure has a convex shape and a height of the convex shape is greater than a height of the concave shape.

20. The electronic device of claim 16, further comprising a coating layer laminated on the second polymer layer, wherein the flexible display panel is configured to be foldable along the at least one folding axis so that the coating layer is exposed to the outside of the electronic device.

* * * * *